(12) United States Patent
Valdez

(10) Patent No.: US 11,433,313 B2
(45) Date of Patent: Sep. 6, 2022

(54) LIVE FIRE GAMING SYSTEM

(71) Applicant: Visual Shot Recognition Gaming, LLC, Dallas, TX (US)

(72) Inventor: David Valdez, Dallas, TX (US)

(73) Assignee: Visual Shot Recognition Gaming, LLC, Dallas, TX (US)

( * ) Notice: Subject to any disclaimer, the term of this patent is extended or adjusted under 35 U.S.C. 154(b) by 0 days.

(21) Appl. No.: 17/011,572

(22) Filed: Sep. 3, 2020

(65) Prior Publication Data

US 2020/0398168 A1 Dec. 24, 2020

Related U.S. Application Data

(63) Continuation-in-part of application No. 16/000,544, filed on Jun. 5, 2018, now abandoned.

(60) Provisional application No. 62/516,711, filed on Jun. 8, 2017.

(51) Int. Cl.
| | | |
|---|---|---|
| *A63F 13/837* | (2014.01) | |
| *F41J 5/14* | (2006.01) | |
| *A63F 13/65* | (2014.01) | |
| *A63F 13/245* | (2014.01) | |
| *A63F 13/335* | (2014.01) | |
| *A63F 13/46* | (2014.01) | |

(52) U.S. Cl.
CPC .......... *A63F 13/837* (2014.09); *A63F 13/245* (2014.09); *A63F 13/335* (2014.09); *A63F 13/46* (2014.09); *A63F 13/65* (2014.09); *F41J 5/14* (2013.01)

(58) Field of Classification Search
CPC ........ F41J 1/00–13/02; A63F 9/08–088; A63F 2009/0846–0896
See application file for complete search history.

(56) References Cited

U.S. PATENT DOCUMENTS

| | | | |
|---|---|---|---|
| 9,891,028 B2 | 2/2018 | Ghani | |
| 10,060,713 B2 | 8/2018 | Ghani | |
| 2002/0007313 A1* | 1/2002 | Mai | G06Q 30/0601 705/14.13 |
| 2003/0082502 A1* | 5/2003 | Stender | F41J 5/10 434/23 |
| 2008/0045336 A1* | 2/2008 | Stelzer | G07F 17/3211 463/30 |
| 2011/0183299 A1 | 7/2011 | Dribben | |
| 2012/0258432 A1 | 10/2012 | Weissler | |
| 2014/0106311 A1 | 4/2014 | Skrpetos | |

(Continued)

*Primary Examiner* — Jasson H Yoo
(74) *Attorney, Agent, or Firm* — Shannon Bates; Harper & Bates LLP

(57) ABSTRACT

The present disclosure relates to systems and methods for live fire gaming wherein the system includes a camera, coupled to a server, for capturing images of a target onto which projectiles are being shot by a shooting device, a processing algorithm, implemented through the server, for identifying each single incremental change to the target associated with an initial and subsequent impact points of projectiles shot onto the target, each identification using only one captured image from the camera for each impact point, and a user-interface touch screen display, coupled to the server, for displaying and interfacing with one or more of: a representation of the target showing the impact points, marketing material, firearm safety information, and firearm training instructions.

19 Claims, 24 Drawing Sheets

(56) References Cited

U.S. PATENT DOCUMENTS

| | | | |
|---|---|---|---|
| 2014/0203103 A1* | 7/2014 | Pitman | B05B 12/085 |
| | | | 239/71 |
| 2014/0265132 A1 | 9/2014 | Layne, IV | |
| 2014/0367918 A1 | 12/2014 | Mason | |
| 2016/0054103 A1* | 2/2016 | Macher | F41J 3/02 |
| | | | 700/92 |
| 2016/0180532 A1* | 6/2016 | Katramados | G06K 9/4661 |
| | | | 382/103 |
| 2016/0298930 A1* | 10/2016 | Squire | F41G 3/26 |
| 2017/0074623 A1 | 3/2017 | Hughes | |
| 2018/0202775 A1 | 7/2018 | Ghani | |
| 2019/0226807 A1* | 7/2019 | Boyer | F41G 1/54 |

\* cited by examiner

Figure 6

CRICKET PLAY

Rules

- This is a 2 player game (modified Cricket rules apply)
- The object is for each player to shoot numbers 9,8,7,6 three(x3) and the bulls eye twice(x2) before the player, in any order
- 3 rounds per game
- Each player will have 6 shots per round to retire numbers
- The player to retire all numbers and the bulls-eye first, and/or has a greater or equal point score wins the game
- After each game the current players will have the option to play again with the same player, start a new game with new players or exit the game
- Web upload options will also be provided upon exiting Score Rules Play Time Left unlimited

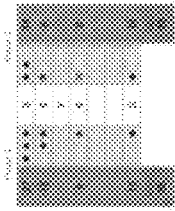

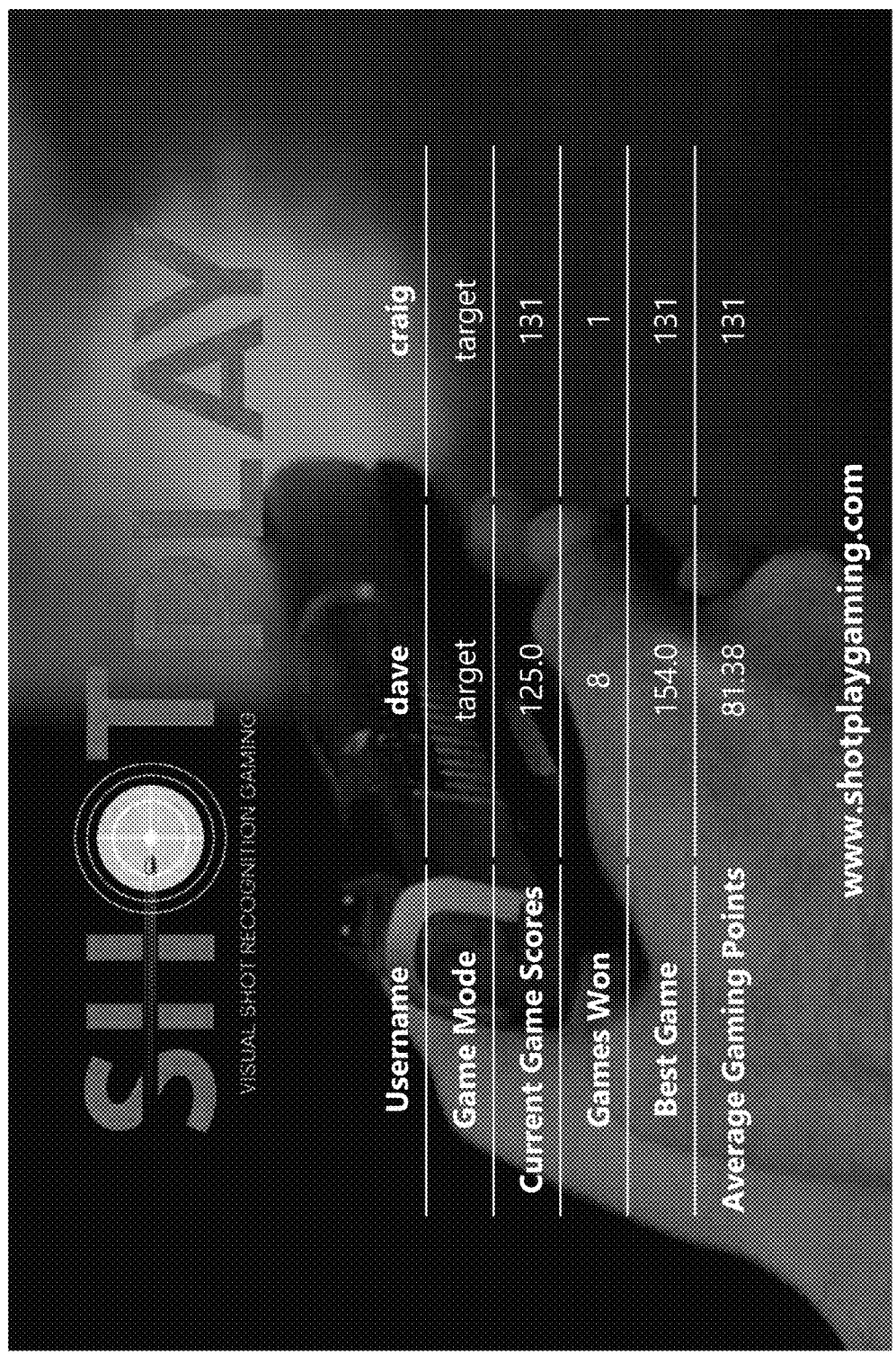
Figure 9A1

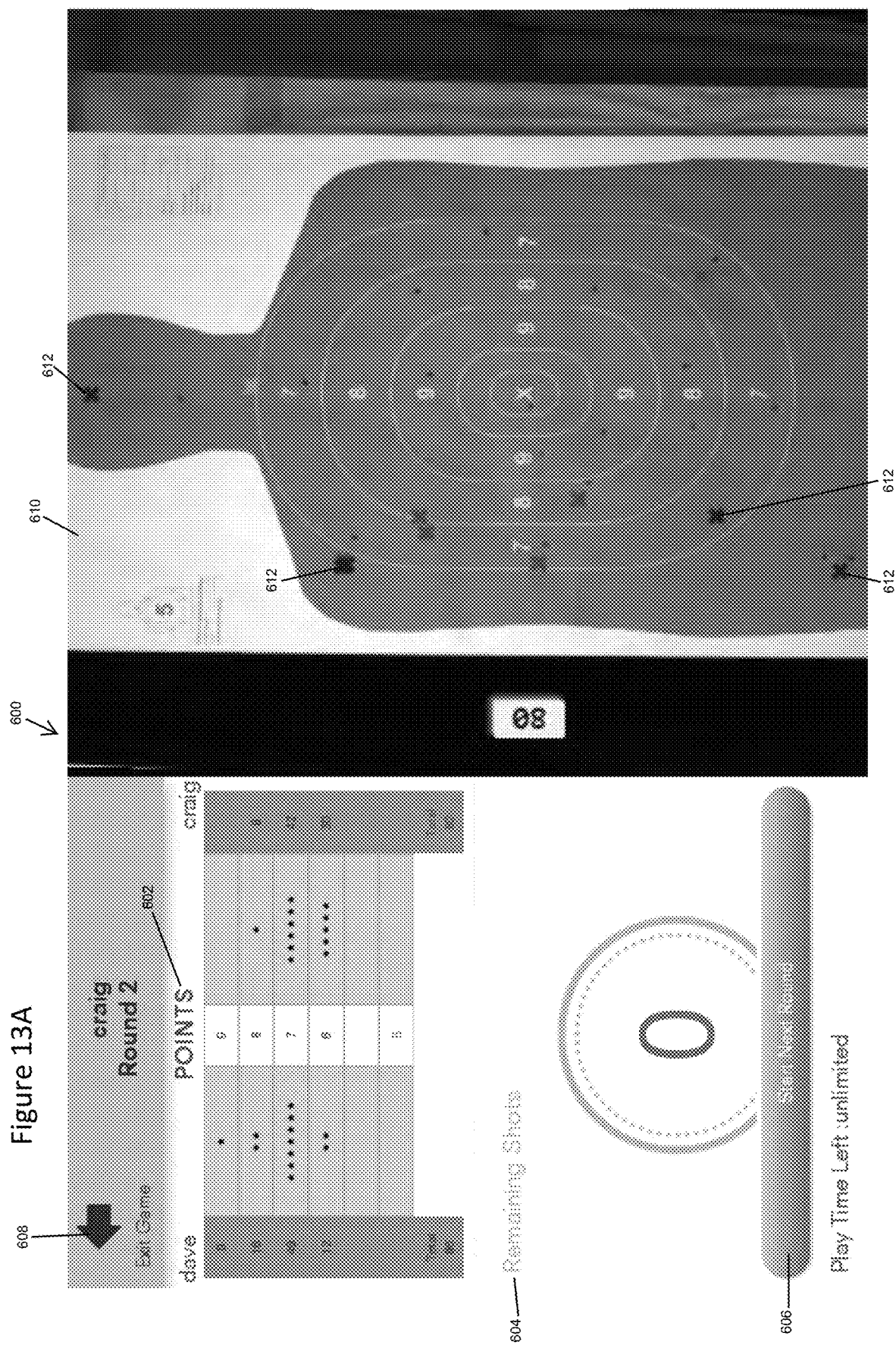

LIVE FIRE GAMING SYSTEM

CROSS-REFERENCE TO RELATED APPLICATIONS

This application is a continuation-in-part of U.S. Non-Provisional patent application Ser. No. 16/000,544, filed on Jun. 5, 2018 and entitled "Live Fire Gaming System", which claims the benefit of, and priority to, U.S. Provisional Patent Application Ser. No. 62/516,711, filed on Jun. 8, 2017 and entitled "Image Processing (IP) Shot Recognition Gaming", each of which is hereby incorporated by reference for all purposes.

BACKGROUND

Shooting sports generally involve utilizing various shooting mediums (typically a type of firearm, bow, or the like) to propel a projectile (typically a bullet, round, arrow, or shot) at a target to measure the shooter's proficiency and performance, including accuracy and consistency. This activity typically comprises two components: a shooting device to be fired by a user and a target, such as a paper target. In prior art shooting systems, a shooter attempts to score "hits" as close as possible to a marked center of the defined target. After completing a desired number of shots, the shooter may evaluate his/her performance up-close only by leaving his/her shooting stall and conducting an inspection of the target itself. These prior art systems do not offer means to remotely evaluate and quantify performance using automated systems and/or methods, and fail to provide the shooter the dynamic and interactive ability to measure their performance against other shooters in various recreational gaming formats and/or applications. The prior art also fails to allow the shooter to clearly distinguish his/her shots, the option and ability to electronically share his/her performance metrics, or the ability to post previous shooting sessions for performance comparison.

SUMMARY OF THE INVENTION

The present disclosure generally relates to systems and methods for integrating image processing (also referred to as "IP") with shooting sports, and in particular image processing shot recognition gaming ("Live Fire Gaming") which utilizes image processing to track shot performance metrics for one or more players, in person or online, in a dynamic, recreational gaming context.

In some implementations, the system according to the present disclosure may comprise a camera, coupled to a server, for capturing images of a target impacted by projectiles shot onto the target from a shooting device; a processing algorithm, implemented through the server, for identifying each single incremental change to the target associated with an initial and subsequent impact points of projectiles shot onto the target, each identification using only one captured image from the camera for each impact point; and a user-interface touch screen display, coupled to the server, for displaying and interfacing with one or more of the following: a representation of the target showing the impact points, marketing material, firearm safety information, and firearm training instructions.

In some implementations, the method according to the present disclosure may comprise capturing a single image relating to an impact point of a projectile shot onto a physical target by a shooting device; identifying each incremental change to the physical target associated with an initial and subsequent impact points of the projectiles, each identification using only a single captured image from the camera for each impact point; and displaying the impact point/s on an electronic representation of the physical target.

The details of one or more implementations are set forth in the accompanying drawings and the description below. Other features, objects, and advantages of the implementations will be apparent from the description, drawings.

BRIEF DESCRIPTION OF THE DRAWINGS

For a more complete understanding of this disclosure, its features, and additional implementations, reference is now made to the following description, taken in conjunction with the accompanying drawings, in which:

FIG. 6 illustrates a user-interface of a "How to Play" "Cricket Play" screen of the Live Fire Gaming system according to a preferred embodiment of the present disclosure.

FIG. 9A1 illustrates an exemplary scorecard file for emailing and/or uploading for the Live Fire Gaming system according to a preferred embodiment of the present disclosure.

FIG. 13A illustrates a user-interface of a further "Begin Play" "Cricket Play" screen of the Live Fire Gaming system according to a preferred embodiment of the present disclosure.

DETAILED DESCRIPTION

The present disclosure generally relates to systems and methods that integrate image processing with the shooting sports, using image processing methods that detect incremental changes to a target. In accordance with the systems and methods of the present disclosure, a single incremental change to the target, such as an impact point from a shot to the target, only requires one camera captured image, versus two or more camera captured images required by prior art systems. Identifying subsequent incremental changes to the target uses the same repeated image processing method. The systems and methods of the present disclosure require no physical connections or alterations to the target (whether wired, sensor attachments, or the like, or specific markings incorporated onto the target), unlike prior art systems and methods.

The systems and methods of the present disclosure further incorporate the ability to assemble, organize, and present one or more of: safety information and/or protocol, firearm training and/or training videos, and/or marketing material and promotions to a user interfacing with the system. The present disclosure may incorporate all three platforms; an image processing gaming platform, a safety and training platform, and a marketing platform, within one system.

Thus, embodiments of the present disclosure generally provide a Live Fire Gaming systems and methods which may be used to track performance metrics such as accuracy, speed, number of attempts, and other useful measurements for individual or multiple shooters (user/s), in person or online. Embodiments of the present disclosure also generally provide systems and methods for delivering safety and training direction and presentations, and/or for enabling marketing and promotions, to users of the Live Fire Gaming systems. Thus, the Live Fire Gaming systems and methods may comprise a plurality of different features, interactions, dynamics, abilities, and components, and are not to be limited to the specific implementations described herein.

Figure 1:
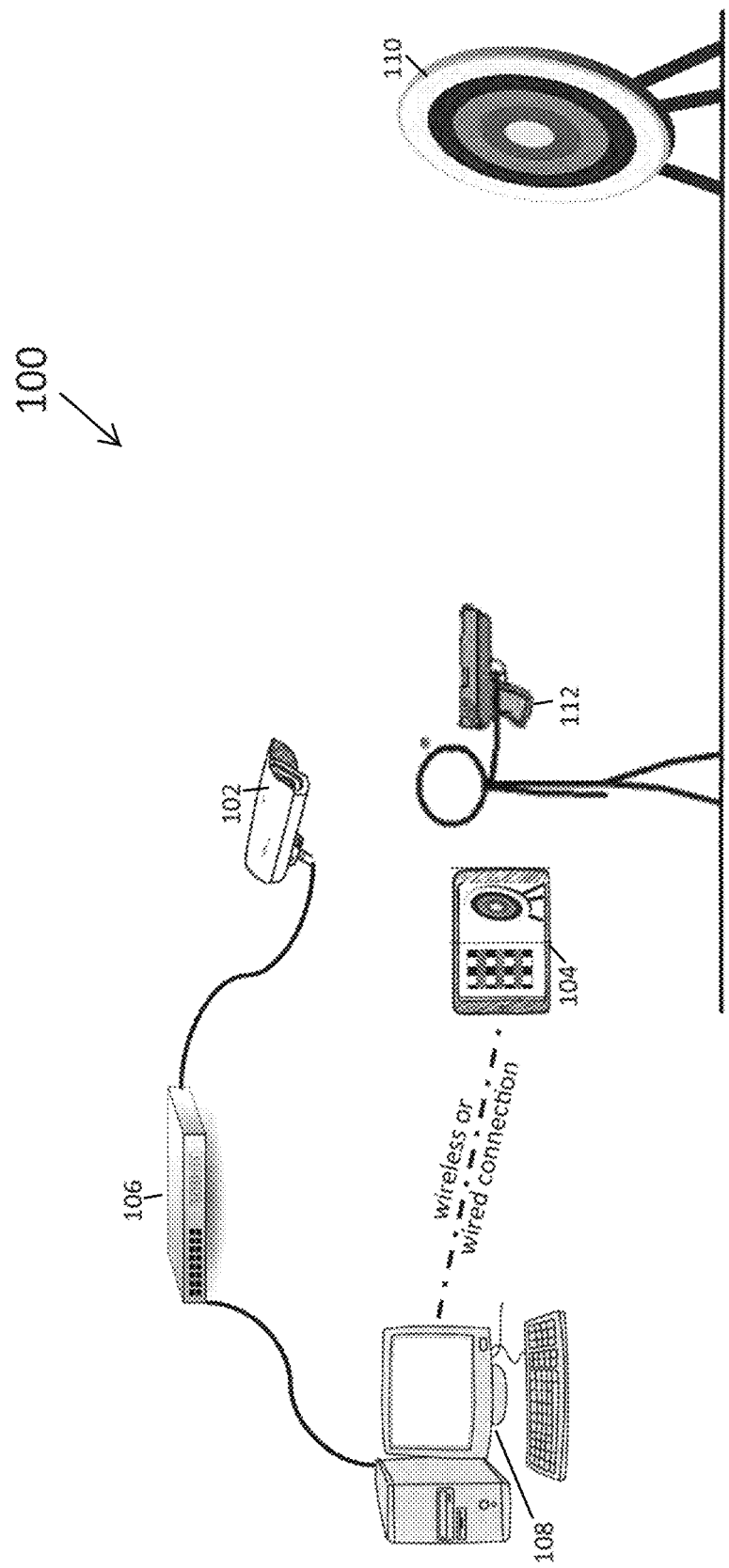
FIG. 1 illustrates a Live Fire Gaming system and methods according to a preferred embodiment of the present disclosure.

FIG. 1 depicts an environment within which a Live Fire Gaming system 100 may be employed according to a preferred embodiment of the present disclosure. The environment generally comprises a shooting device 112 for discharging projectiles, and at least one target 110 for receiving hits of discharged projectiles. The Live Fire Gaming system 100 comprises at least one camera 102 to capture, collect, and relay live images at predetermined frames per second (fps) to distinguish changes in the target 110 effected by projectiles discharged from the shooting device 112; at least one computer processing server 108 that receives the live images from the camera 102, analyzes and processes the live images to identify the projectile hits (or impact points) on the target 110, generates performance metrics therefrom, and administratively manages the overall Live Fire Gaming system 100; and a touch screen device 104 that receives the performance metrics generated by computer processing server 108, displays the performance metrics as well as the impact points on the target 110 on a corresponding user-interface screen, and further enables a user to interface with the Live Fire Gaming system 100 (e.g., by selecting from a menu of gaming options, inputting player information, receiving instructions, visually displaying live images of the target 110 relayed from the camera 102 during game play, viewing player proficiency, displaying a player's past shooting sessions, uploading player proficiency, viewing and interfacing with marketing and promotions, viewing and interfacing with safety and training directions and presentations, etc.) Communication and/or transmission of data between the camera 102 and the computer processing server 108, as well as between computer processing server 108 and touch screen device 104 may occur through network, cloud, Wi-Fi or other connection means known in the art.

In other implementations having multi-player formats, multiple cameras and multiple touch screen devices may be used. In such implementations, one or more cameras 102 may be connected to an Ethernet switch 106 that may then directly relay the individual live camera images from the one or more cameras 102 to the computer processing server 108. The computer processing server 108 may then make available the generated performance metrics to each of the corresponding touch screen devices 104.

The computer processing server 108 may comprise a central processing unit for processing information; an image processing ("IP") algorithm for analyzing and processing images transmitted via camera 102; an analysis program for generating performance metrics based on the analysis and processing of images by the IP algorithm; a database or other storage device for storing generated performance metrics, along with acquired, calculated and other generated data; a wired or wireless connection to enable the touch screen device 104 to access and display the generated performance metrics, as well as display player information and gaming interface; a bus system for communication between components of the computer processing server; a wireless, cloud, or web interface for communication with and transmission to the world wide web or external devices; and may further comprise other elements and/or components known in the art.

The Live Fire Gaming system 100 may be used in a variety of environments and contexts, and is not limited to any particular embodiment herein disclosed. For example, shooting device 112 may comprise any type of firing device, including but not limited to a firearm, a pistol, a gun, a rifle, a "play" gun, a device capable of projecting a projectile, a signal, a laser, light, etc. Likewise, target 110 may comprise any form of target known in the art, including paper targets, steel targets, a bulls-eye, silhouettes, etc., as may be determined by the user. Point values or proficiency metrics may be assigned to various areas of the target and quantified in various manners to measure a user's proficiency and performance.

With continued reference to FIG. 1, a method of Live Fire Gaming according to the present disclosure will now be described. Using touch screen device 104, a user may review and select a desired gaming option. Selections may be based on preferred type of game, number of players desired by the user, and/or any other variable user option. After selecting a gaming option and reviewing any instructions, the user may, with the shooting device 112, assume a position at a designated distance from target 110. The touch screen device 104 may provide the user with gaming information as well as an enlarged live view of the target 110. As the user fires one or more projectiles from shooting device 112, camera 102 captures and collects images at pre-determined frames per second and relays images of the target 110 with the impact point(s) of the projectile(s) to the computer processing server 108. The computer processing server 108 transmits the captured images of the target 110 with impact points thereon to the touch screen device 104. Touch screen device 104 displays a live image of target 110 along with each impact point of the projectile made upon the target 110. Each impact point may be displayed on touch screen device 104, overlaid on the live image of the target 110 by a colored marker. The touch screen device 104 may refresh the color-marked impact points of the projectiles overlaid upon the live image of the target 110 with new color-marked impact points each time the user fires projectiles from shooting device 112 at the target 110.

The IP algorithm residing on the computer processing server 108 further analyzes the impact points, including for example, the accuracy and/or point value established of each impact, the number of projectiles fired, time between shots, and other performance metrics. The computer processing server 108 processes, computes, and transmits the processed data as scores and/or proficiency metrics to be displayed on the touch screen device 104, thereby allowing the user to review his/her performance metrics, game scores, and/or proficiency progress among any other usable and trackable data within the art. The user may then continue with another round of the selected game until the current game has finished. Then the user(s) may select to replay the game, select a new game, review their proficiency metric results, share their performance metric(s) by emailing them and then uploading to the internet, social media, and the like, or exit the Live Fire Gaming system 100.

Figure 16:
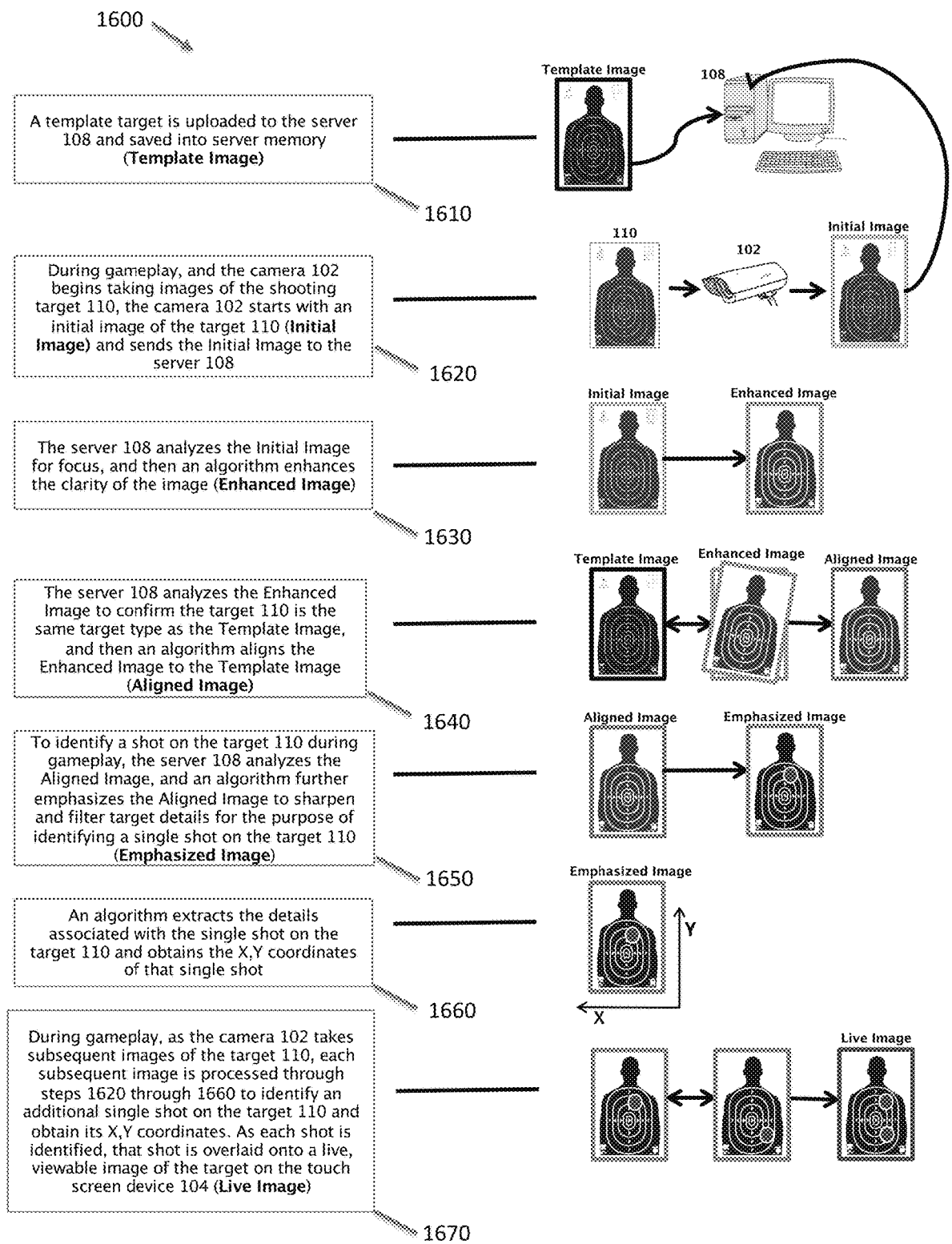
FIG. 16 illustrates a flow chart depicting an implementation of an image processing method to identify shots on a target of the Live Fire Gaming system according to a preferred embodiment of the present disclosure.

With reference now to FIG. 16, an implementation of an image processing method 1600 employed by the Live Fire Gaming system to identify impact points on the target 110 will now be described. At step 1610, an initial template target is uploaded to the server 108 and saved into the server memory as a Template Image. The template target may be any graphic content, such as a silhouette with numbered score indicators to quantify shooter proficiency, a bulls-eye in the form depicted in FIG. 1, or any other type of template target. Therefore, multiple different template target options may be uploaded, resulting in multiple different Template Images being saved into the server memory.

In an implementation, a Template Image is preferably a clear, focused image of the template target, with substantially consistent color gradations across the target area. The Template Image is preferably orientationally aligned in a squared, flat position within a 3-dimensional X,Y,Z coordinate system, such that the left vertical edge runs substantially along the Y axis, the lower horizontal edge runs substantially along the X axis, and the Template Image is substantially at a zero angle with respect to the Z-axis. Within the method 1600 of FIG. 16, the Template Image is used by the IP algorithm residing on the computer processing server 108 as a basis to clarify, confirm, align and filter images of the gaming target 110 for the purpose of identifying impact points associated with shots on the target 110, as described in more detail herein.

At step 1620, during gameplay, when the camera 102 begins taking images of the shooting target 110, the camera 102 starts with an initial image of the target 110 (Initial Image) and sends the Initial Image to the server 108. Due to environmental conditions, such as lighting, wind that moves a hanging target 110, distance of the target 110 from the camera 102, angle of the camera 102 relative to the target 110, orientational position of the target 110, and other factors, the Initial Image may be blurry, out of alignment, or otherwise not as clear as the Template Image. As such, the IP algorithm adjusts and filters the Initial Image in the next series of filtering steps to identify a shot on the target 110.

At step 1630, the server 108 analyzes the Initial Image to determine how blurry or focused the Initial Image is, and the IP algorithm then enhances the clarity of the Initial Image to produce an Enhanced Image.

At step 1640, the server 108 analyzes the Enhanced Image in comparison to the Template Image to confirm the target 110 is of the same type as the Template Image, and the IP algorithm then orientationally aligns the Enhanced Image to the Template Image along the X,Y,Z, planes to produce an Aligned Image.

To identify a shot on the target 110 during gameplay, at step 1650, the server 108 analyzes the Aligned Image, and the IP algorithm further emphasizes the Aligned Image to sharpen and then filter target details to determine any differences associated with the target 110 relative to the IP algorithm's programmed filters, thereby identifying a single shot on the target 110, and producing an Emphasized Image with the shot identified.

At step 1660, the IP algorithm extracts those details filtered from the Emphasized Image associated with the single shot on the target 110 and obtains the X, Y coordinates of that single shot. Once the single shot is so identified, that shot is overlaid onto a live, viewable image of the target 110 on the touch screen device 104 (Live Image).

During gameplay, as the camera 102 continues taking subsequent images of the target 110, each subsequent image is processed and filtered through step 1620 through step 1660 as described above to identify each additional single shot on the target 110 and its associated X, Y coordinates. As each shot is so identified, that shot is overlaid onto the Live Image.

With reference now to FIGS. 2 through 15, a user-interface flow diagram outlining the Live Fire Gaming system 100, as well as corresponding exemplary user-interface screens as they may generally appear on touch screen device 104, will now be described. While user-interface screens shown and described in FIGS. 2 thru 15 refer to specific games and examples (including "Target Play," "Cricket Play," and/or "Timed Play" gaming), and other functions, it is to be understood that these games and other interface functions are shown by way of example, and the present disclosure is not limited to any specific games, gaming embodiments, marketing, safety and/or training functions.

Figure 2:
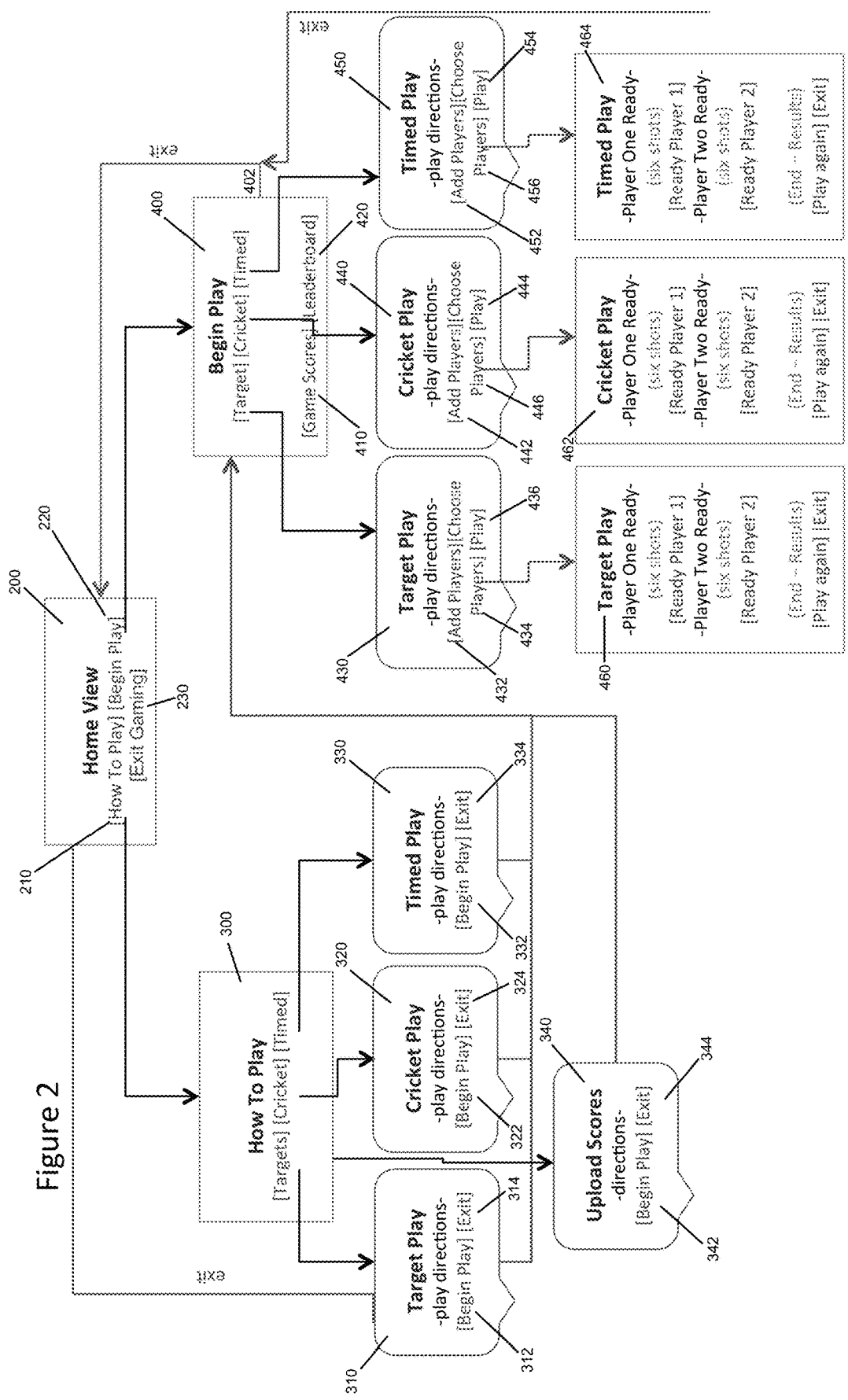
FIG. 2 illustrates an implementation of a user-interface flow diagram of the Live Fire Gaming system according to a preferred embodiment of the present disclosure.
Figure 3:
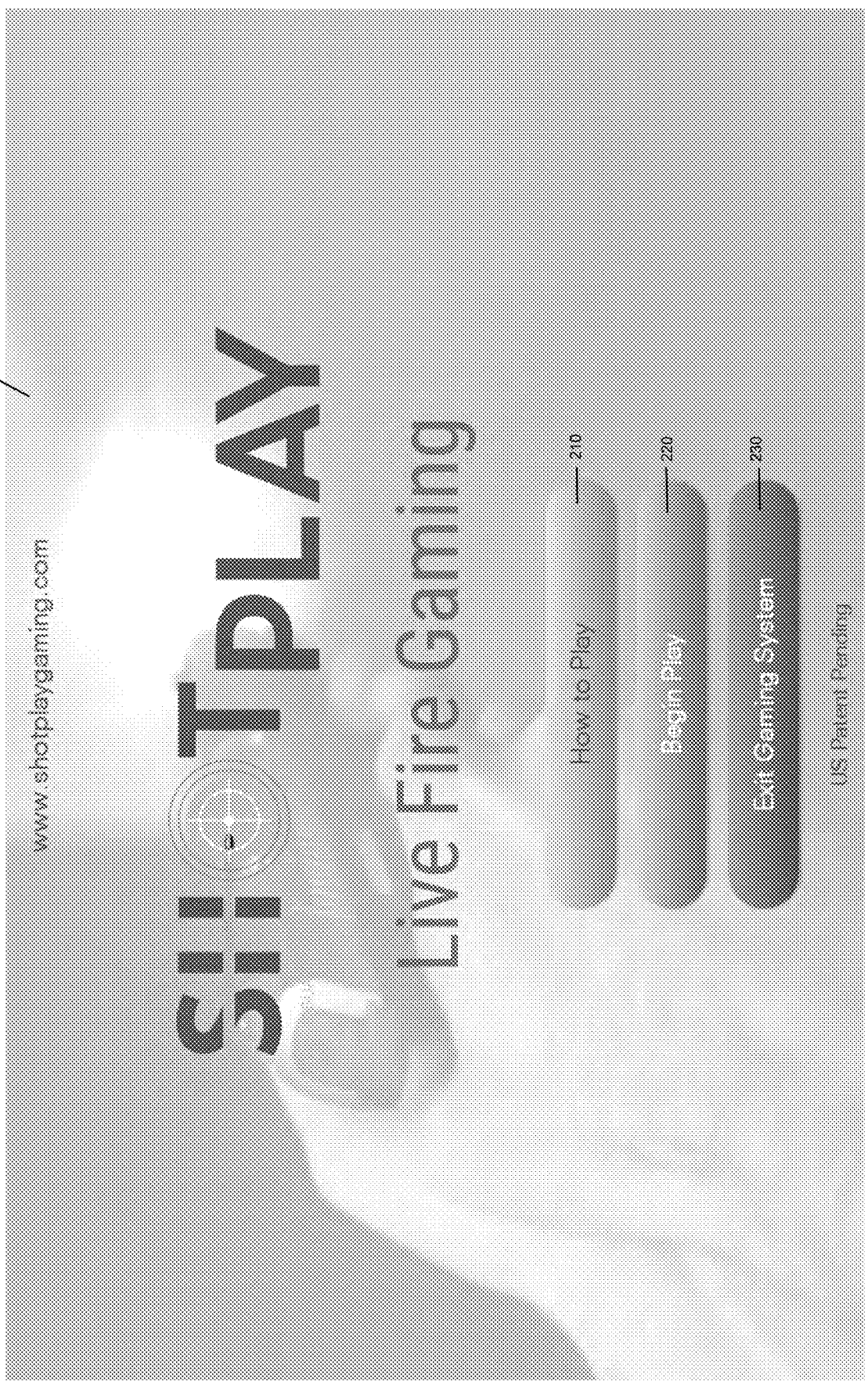
FIG. 3 illustrates a user-interface of a "Home View" screen of the Live Fire Gaming system according to a preferred embodiment of the present disclosure.

FIG. 2 depicts a generalized user-interface flow diagram depicting one implementation of a method of the Live Fire Gaming system according to a preferred embodiment of the present disclosure. In FIG. 2, the user-interface flow diagram begins with a "Home View" 200, which allows a user to select between three options: "How To Play" 210, "Begin Play" 220, or "Exit Gaming System" 230. FIG. 3 depicts a corresponding exemplary user-interface screen for "Home View" 200.

Figure 4:
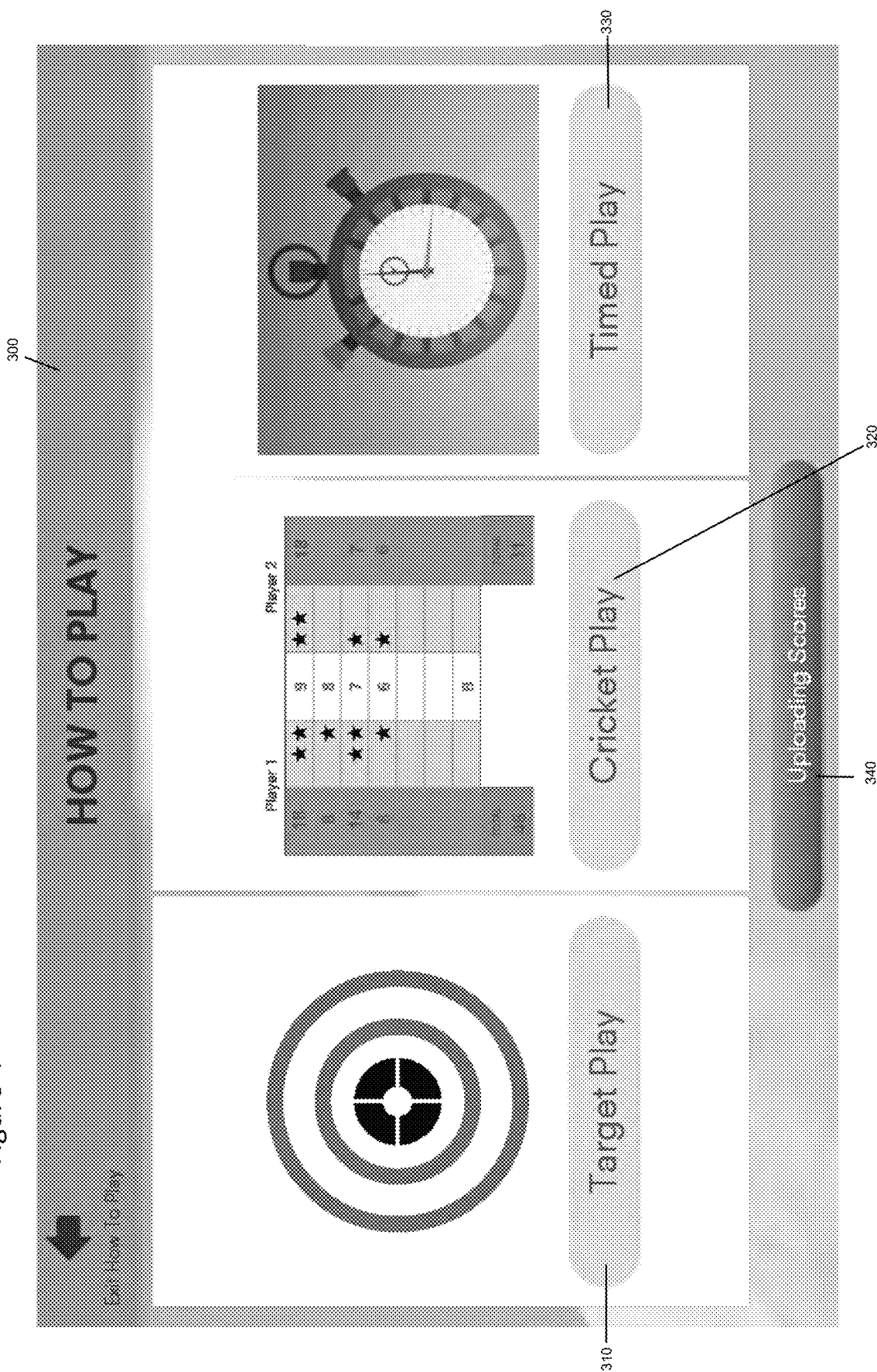
FIG. 4 illustrates a user-interface of a "How to Play" screen of the Live Fire Gaming system according to a preferred embodiment of the present disclosure.

When a user selects "How to Play" 210 on "Home View" 200, as shown in FIG. 3, he/she may be directed to an exemplary user-interface "How to Play" screen 300, such as that depicted in FIG. 4. The user may then select and receive instruction on any one among a number of shooting games displayed on the "How To Play" screen 300. These may include, by way of example, instructions for "Target Play" 310, "Cricket Play" 320, and/or "Timed Play" 330. The user may also select "Uploading Scores" 340 to receive instructions for emailing performance metrics (including, by way of example, scores, results, and/or proficiency data), which may also be uploaded to social media, the internet, or the like.

Figure 5:
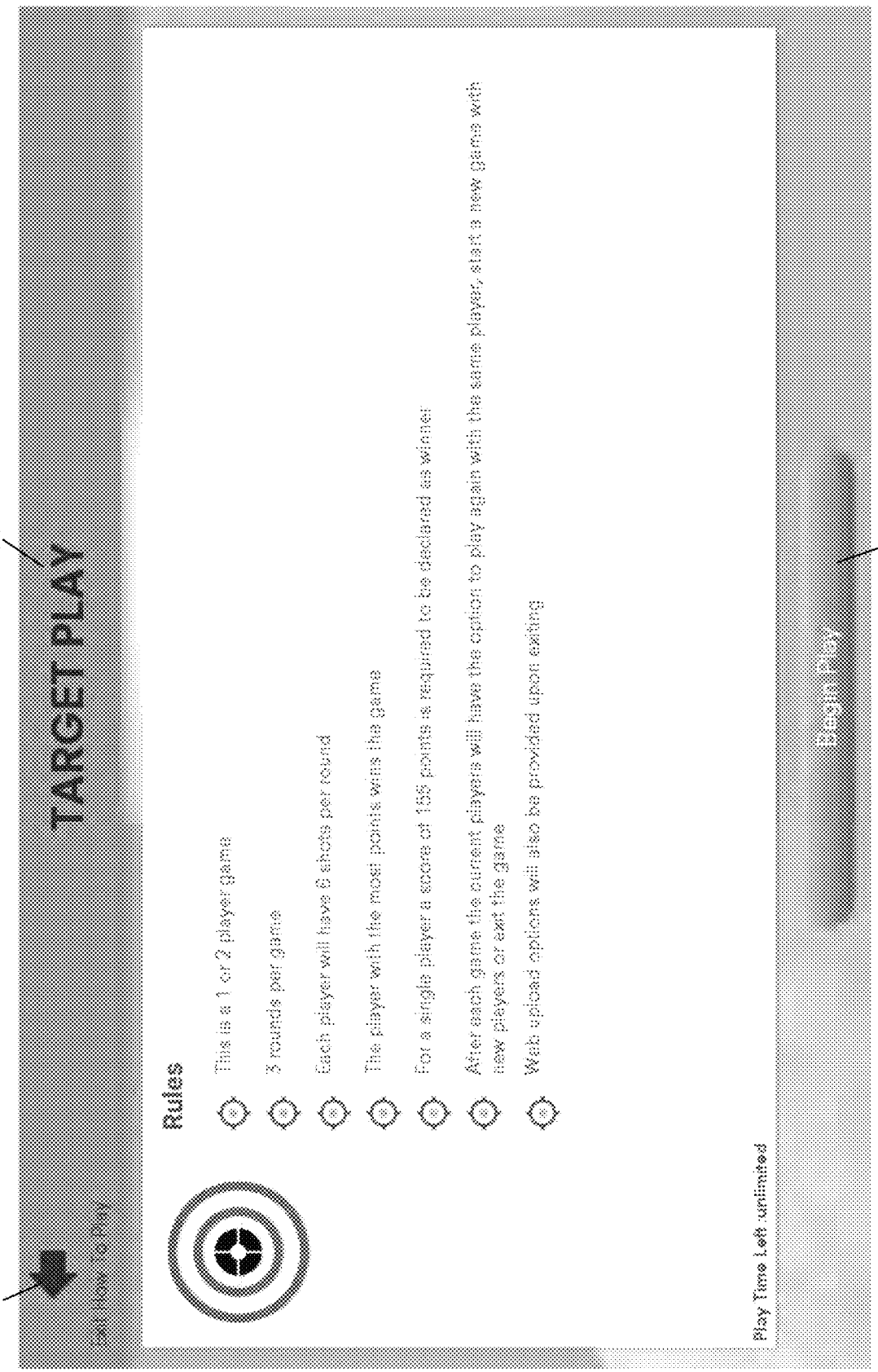
FIG. 5 illustrates a user-interface of a "How to Play" "Target Play" screen of the Live Fire Gaming system according to a preferred embodiment of the present disclosure.
Figure 7:
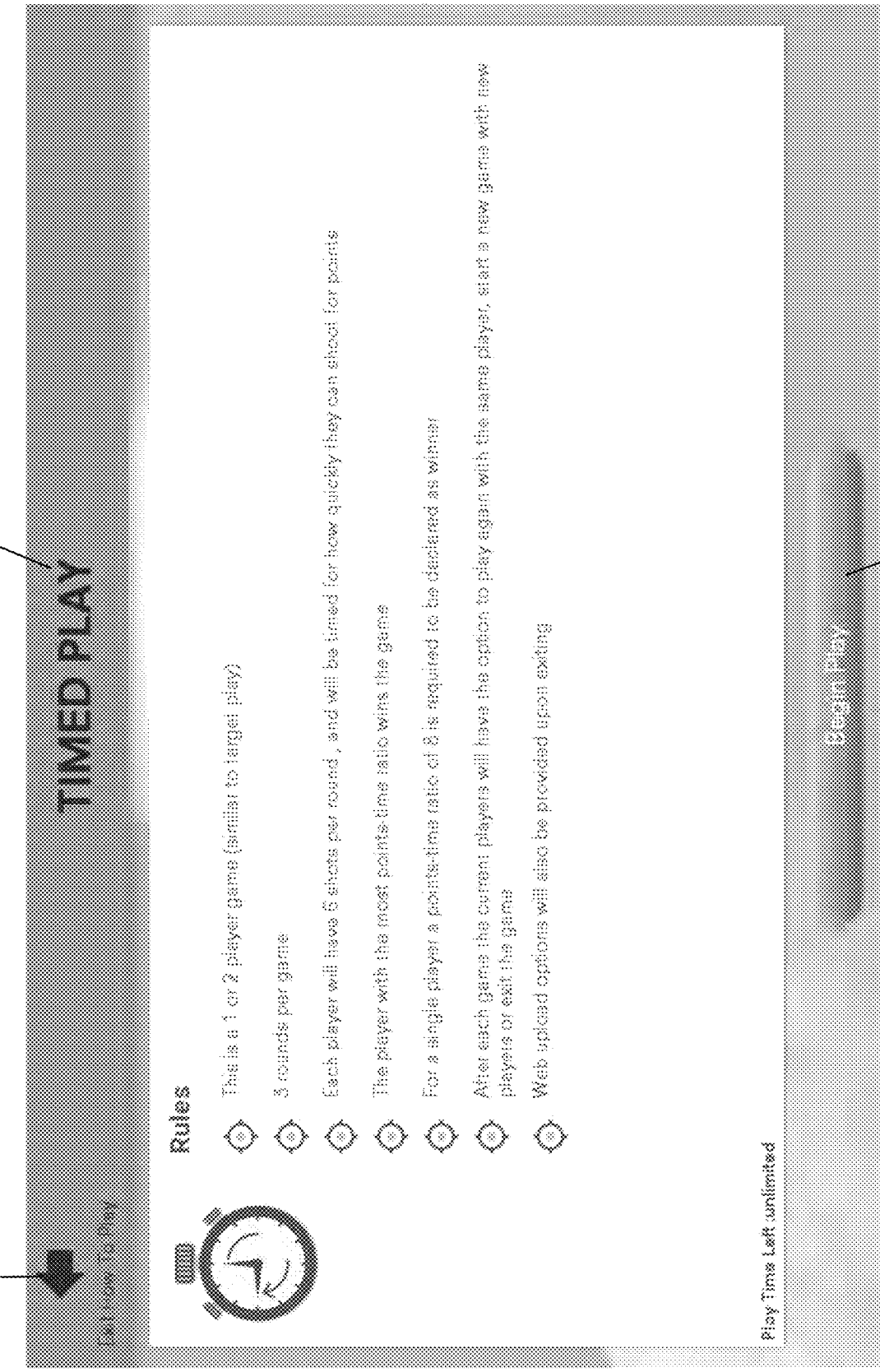
FIG. 7 illustrates a user-interface of a "How to Play" "Timed Play" screen of the Live Fire Gaming system according to a preferred embodiment of the present disclosure.

Reference is now made to FIGS. 5 through 7, wherein is depicted exemplary user-interface screens comprising user instructions and/or objectives for the exemplary shooting games available for user selection, as depicted in FIG. 4. FIG. 5 depicts an exemplary user-interface screen with user instructions for "Target Play" 310. This instructional user-interface screen may further include an "Exit How To Play" selection 314, which may allow the user to return to a previous screen, and a "Begin Play" selection 312 which may direct the user to a "Begin Play" screen 400 (see FIG. 9) to allow the user to commence playing a selected game. FIG. 6 depicts an exemplary user-interface screen with user instructions for "Cricket Play" 320. This instructional user-interface screen may further include an "Exit How To Play" selection 324, which may allow the user to return to a previous screen, and a "Begin Play" selection 322 which may direct the user to a "Begin Play" screen 400 (see FIG. 9) to allow the user to commence playing a selected game. FIG. 7 depicts an exemplary user-interface screen with user instructions for "Timed Play" 330. This instructional user-interface screen may further include an "Exit How To Play" selection 334, which may allow the user to return to a previous screen, and a "Begin Play" selection 332 which may direct the user to a "Begin Play" screen 400 (see FIG. 9) to allow the user to commence playing a selected game.

Figure 8:
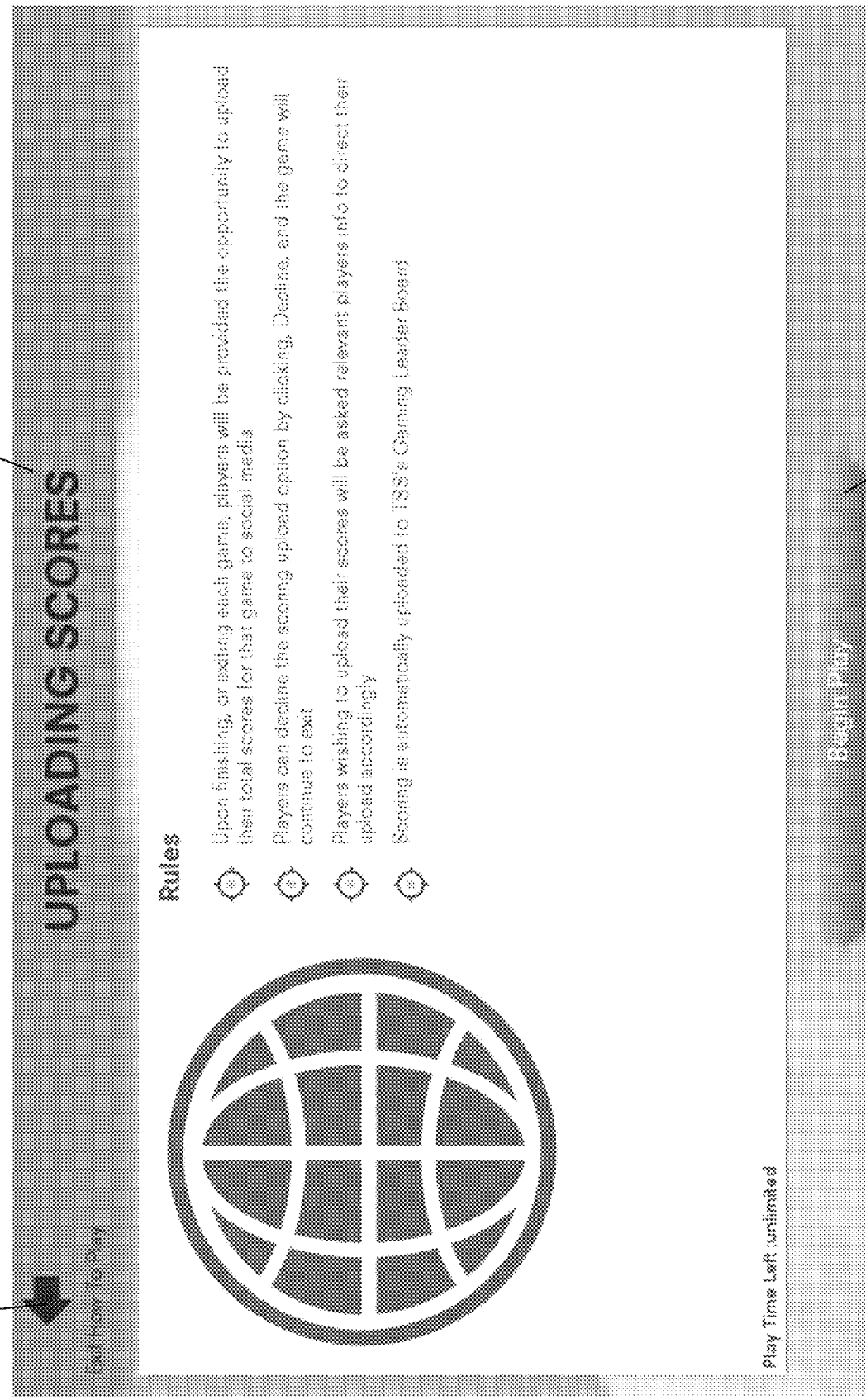
FIG. 8 illustrates a user-interface of a "How to Play" "Uploading Scores" screen of the Live Fire Gaming system according to a preferred embodiment of the present disclosure.

Reference is now made to FIG. 8, wherein is depicted an exemplary user-interface screen comprising user instructions for "Uploading Scores" 340. This instructional user-interface screen may provide instructions to the user regarding e-mailing performance metrics (such as scores, results, and/or proficiency data), which may be uploaded onto various internet websites, including social media sites, and/or onto an external application. The "Uploading Scores" 340 user-interface screen may further include an "Exit How To Play" selection 342, which may allow the user to return to a previous screen, and a "Begin Play" selection 344 which may direct the user to a "Begin Play" screen 400 (see FIG. 9) to allow the user to commence playing a selected game.

Figure 2A:
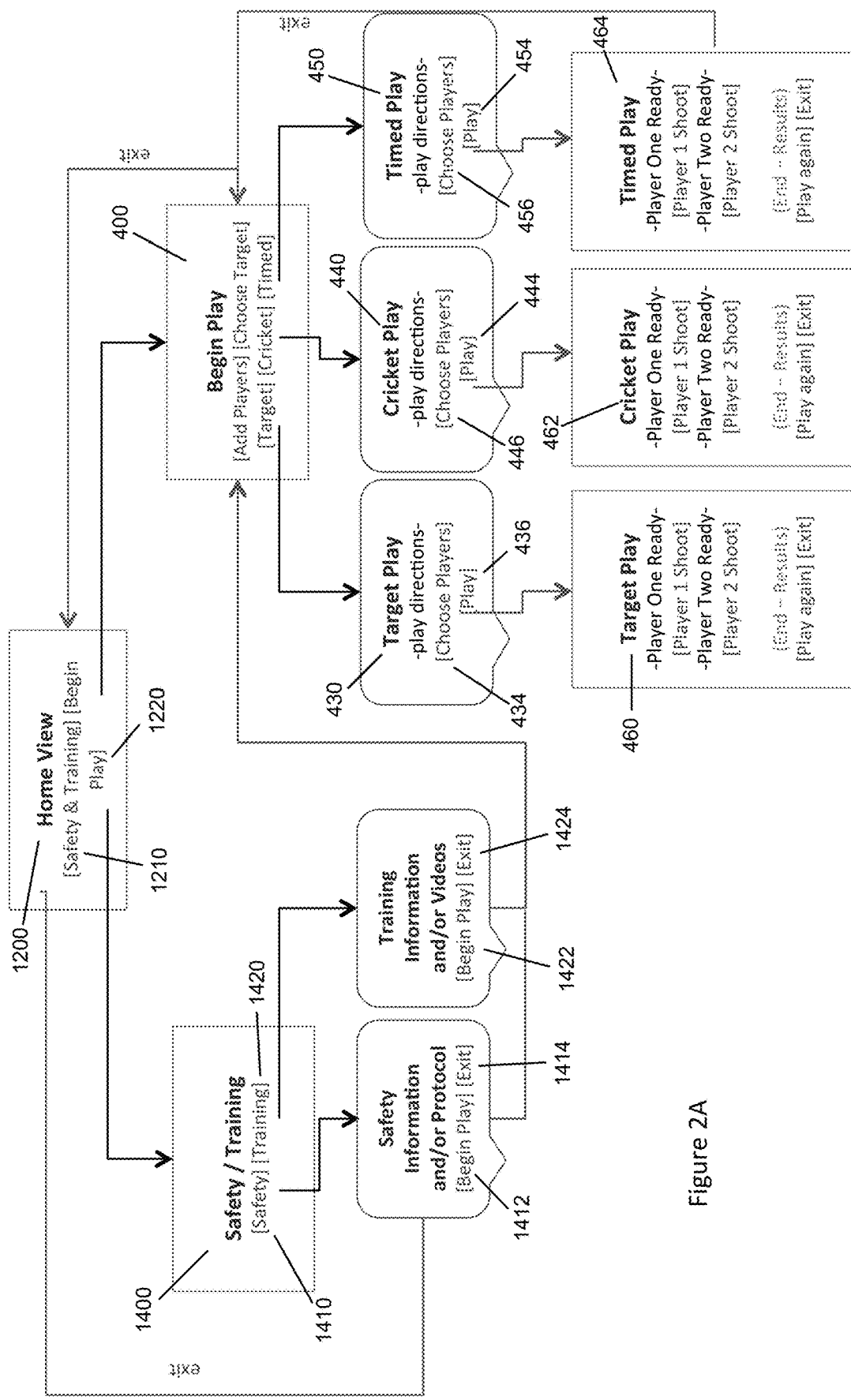
FIG. 2A illustrates another implementation of a user-interface flow diagram of the Live Fire Gaming system according to a preferred embodiment of the present disclosure.

Reference is now made to FIG. 2A, which depicts a generalized user-interface flow diagram depicting another implementation of a method of the Live Fire Gaming system according to a preferred embodiment of the present disclosure. With respect to FIGS. 2 and 2A, like reference numerals refer to like features of the representative methods.

Figure 4A:
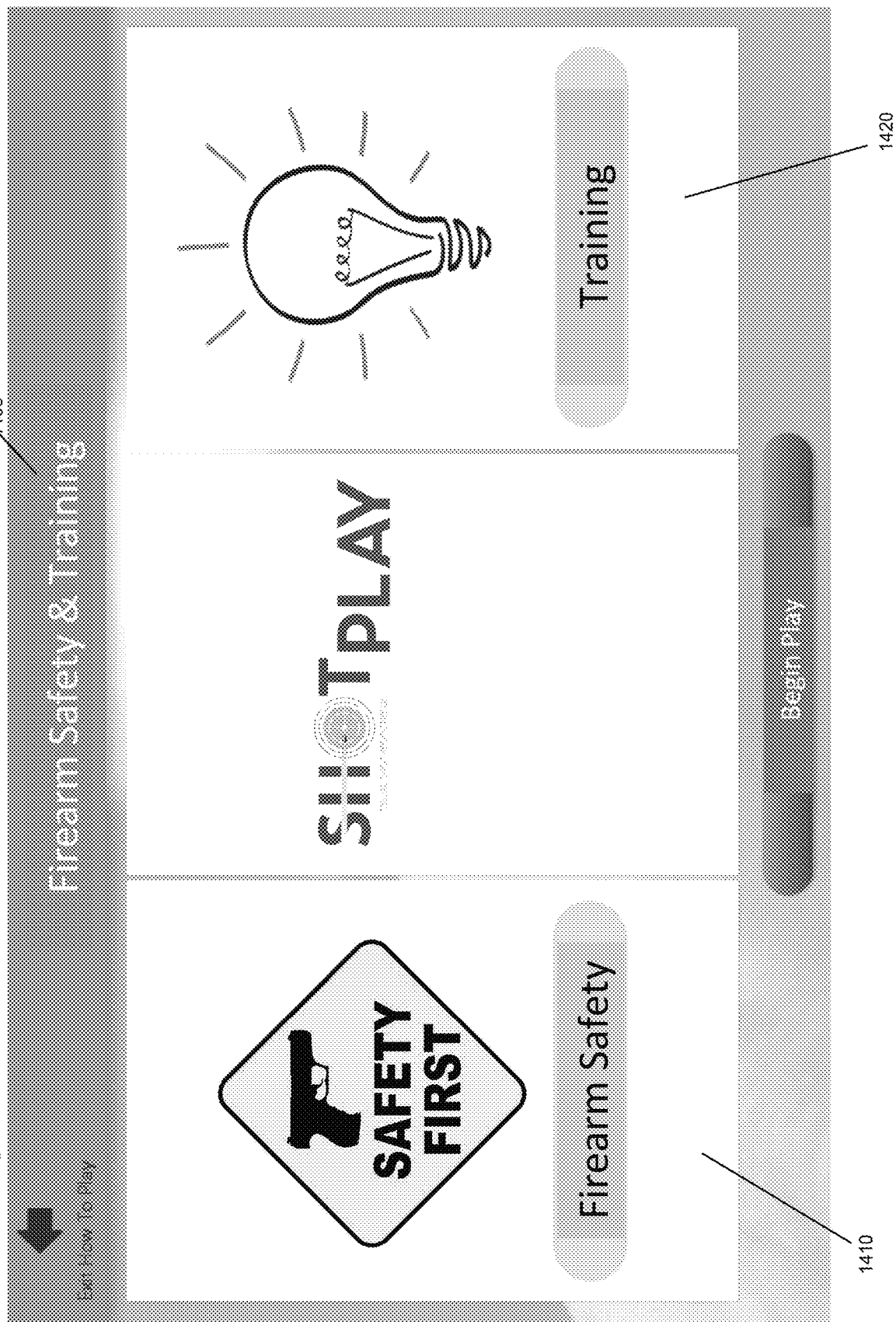
FIG. 4A illustrates a user-interface of a "Firearm Safety & Training" screen of the Live Fire Gaming system according to a preferred embodiment of the present disclosure.

In FIG. 2A, the user-interface flow diagram begins with a "Home View" 1200, which allows a user to select between two options: "Safety and Training" 1210 and "Begin Play" 1220. When a user selects "Safety & Training" 1210 on "Home View" 1200, he/she may be directed to an exemplary user-interface "Safety & Training" screen 1400, such as that depicted in FIG. 4A. The user may then select from several different safety and training options, including "Firearm Safety" 1410, which provides gun safety information and/or protocol as generally accepted in the shooting industry, and/or "Training" 1420, which provides training information and/or videos on correct firearm use as generally accepted in the shooting industry. The "Safety & Training" screen 1400 may also include additional information and instruction as it relates to safety and/or training. As indicated in FIG. 2A, the "Firearm Safety" 1410 option allows a user to select between "Begin Play" 1412 to display the safety information and/or protocol, and "Exit" 1414 to return the user to the main "Safety & Training" screen 1400. Likewise, the "Training" 1420 option allows a user to select between "Begin Play" 1422 to display the training information and/or videos that may further be selected by the user, and "Exit" 1424 to return the user to the main "Safety & Training" screen 1400.

Figure 9:
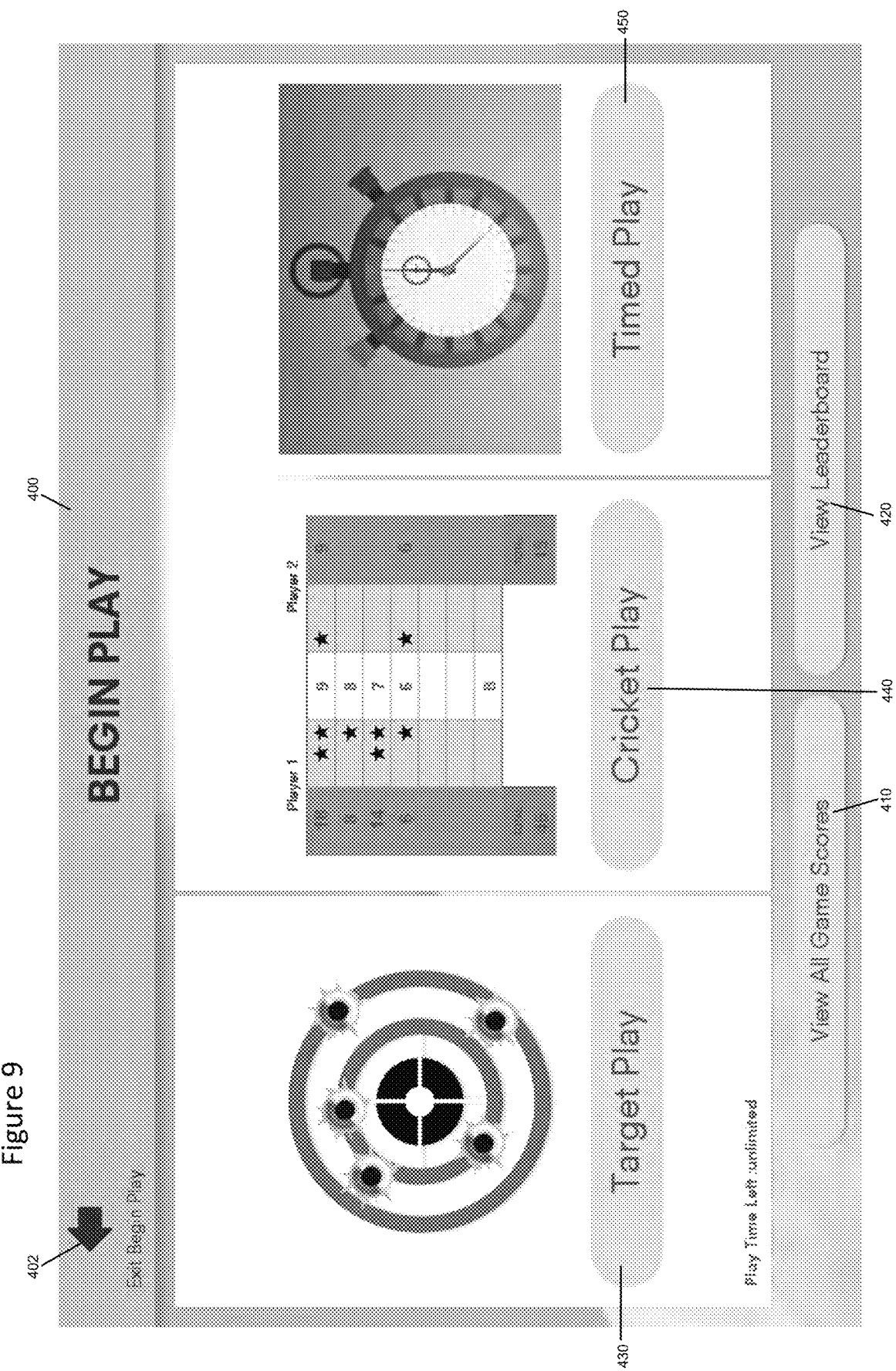
FIG. 9 illustrates a user-interface of a "Begin Play" screen of the Live Fire Gaming system according to a preferred embodiment of the present disclosure.

With reference now to FIG. 2 and/or FIG. 2A in conjunction with FIG. 9, the "Begin Play" selections 220, 312, 322, 332, 342 of FIG. 2 may direct the user to a "Begin Play" user-interface screen 400, which allows the user to select system games to play and receive play instructions relating thereto. These game selections may include, by way of example only and not limitation, "Target Play" 460, "Cricket Play" 462, and/or "Timed Play" 464, or any other game offered by the Live Fire Gaming system. As shown in FIG. 9, the "Begin Play" user-interface screen 400 may also allow a user to "View All Game Scores" 410 for the current gaming session, or "View Leaderboard" 420 which allows viewing of all retained scores for those users within provided time frames. The "Begin Play" user-interface screen 400 may also optionally allow the user to select any pre-designated target types (such as target 110 depicted in FIG. 1). This would allow the user the ability to randomly generate proficiency areas on a designated target surface (typically paper) thereby creating a target 110. The user may then select a game and receive play instructions of the game to be played (e.g., play instructions for "Target Play" 430, "Cricket Play" 440, "Timed Play" 450, or play instructions for any other game offered by the Live Fire Gaming system 100 or devised in the art). The "Begin Play" user-interface screen 400 may also include an "Exit Begin Play" selection 402 to enable a user to return to the previous "Home View" 200.

Figure 9A:
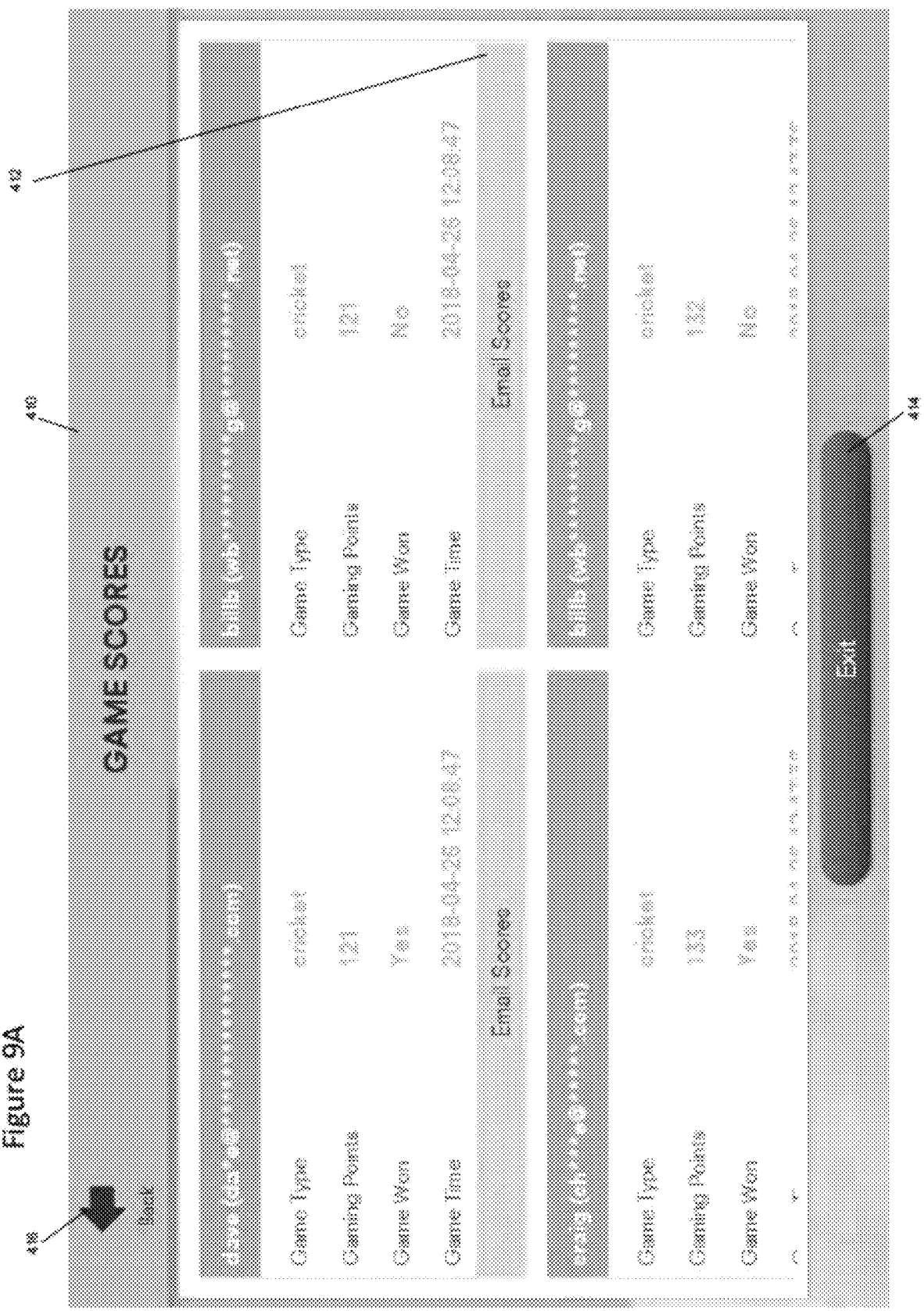
FIG. 9A illustrates a user-interface of a "Begin Play" "Game Scores" screen of the Live Fire Gaming system according to a preferred embodiment of the present disclosure.

With reference now to FIG. 2 and/or FIG. 2A in conjunction with FIGS. 9, 9A and 9A1, when the user selects the "View All Game Scores" 410 of FIG. 9, the "Game Scores" user-interface screen 410, as shown by way of example in FIG. 9A, may allow users to view all game scores for a current gaming session, including but not limited to games played in "Target Play" 460, "Cricket Play" 462, and/or "Timed Play" 464, or any other game offered by the Live Fire Gaming System or devised in the art. As shown in FIG. 9A, the "Game Scores" user-interface screen 410 may also allow a user, by selecting "Email Scores" 412, to email performance metrics, such as current game scores, results, and/or proficiency data, to themselves and thereby upload such performance metrics onto various internet websites, such as social media sites, and/or onto an external application, etc. FIG. 9A1 depicts an exemplary graphic with performance metrics that may be emailed by a user and uploaded onto internet websites or social media sites. With continued reference to FIG. 9A, the "Game Score" user-interface screen 410 may also include an "Exit" 414 or "Back" 416 selection to enable a user to return to the previous "Begin Play" user-interface screen 400 of FIG. 9.

Figure 9B:
FIG. 9B illustrates a user-interface of a "Begin Play" "Leaderboards" screen of the Live Fire Gaming system according to a preferred embodiment of the present disclosure.

With reference now to FIG. 2 and/or FIG. 2A in conjunction with FIGS. 9 and 9B, when the user selects the "View Leaderboard" 420 of FIG. 9, the "Leaderboards" user-interface screen 420, as shown by way of example in FIG. 9B, may allow users to view game scores and/or performance metrics for current and past gaming sessions for applicable users within specified time frames, including but not limited to those games played in "Target Play" 460, "Cricket Play" 462, and/or "Timed Play" 464, or any other game offered by the Live Fire Gaming system or devised in the art. As shown in FIG. 9B, the "Leaderboards" user-interface screen 420 may allow a user, through drop-down menus 422, 424, 426, the ability to filter all applicable user score results or metrics for each game. The "Leaderboards" user-interface screen 420 may also include an "Exit" 428 or "Back" 429 selection to enable a user to return to the previous "Begin Play" user-interface screen 400 of FIG. 9.

Figure 10:
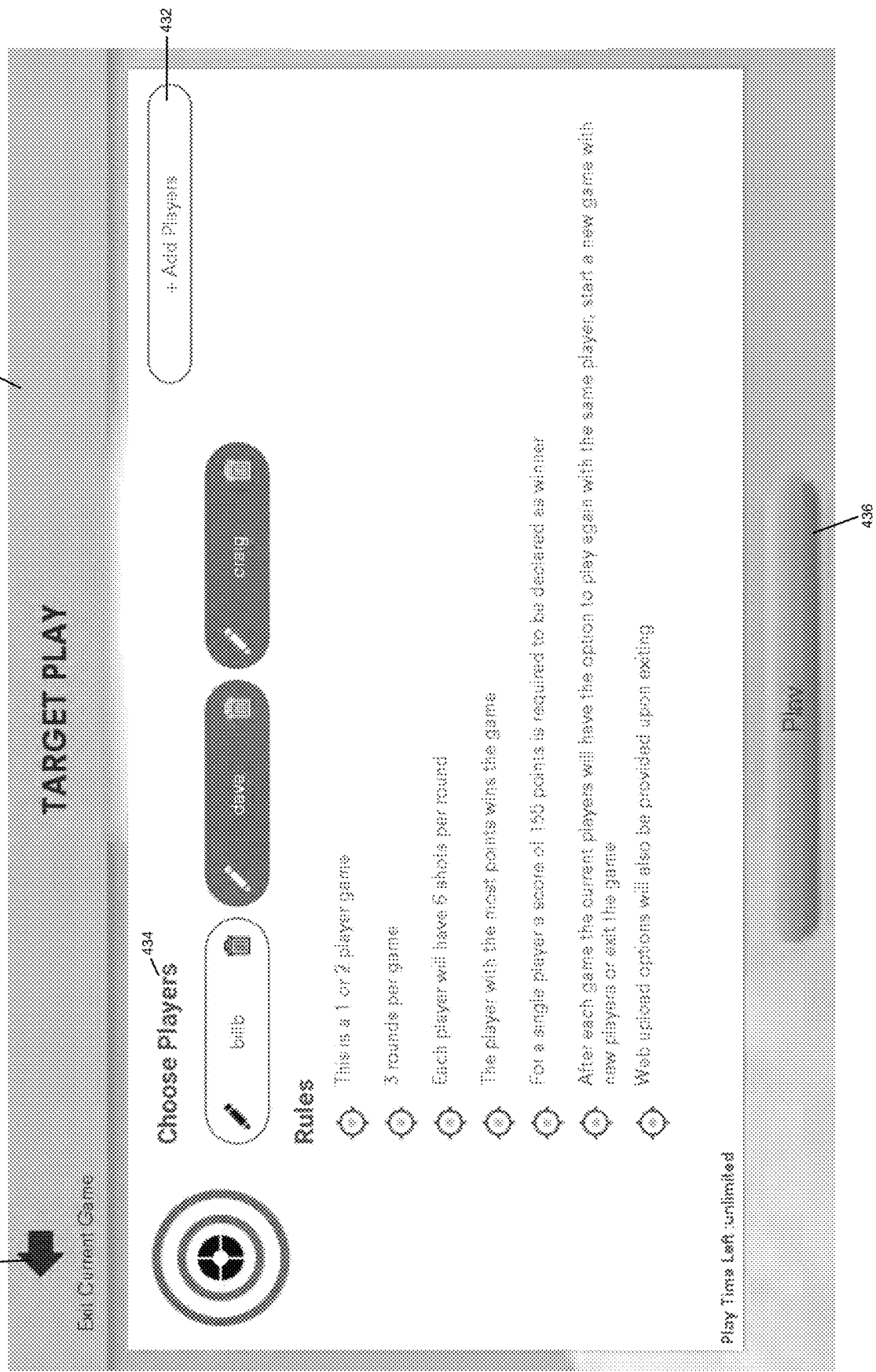
FIG. 10 illustrates a user-interface of a "Begin Play" "Target Play" screen of the Live Fire Gaming system according to a preferred embodiment of the present disclosure.
Figure 11:
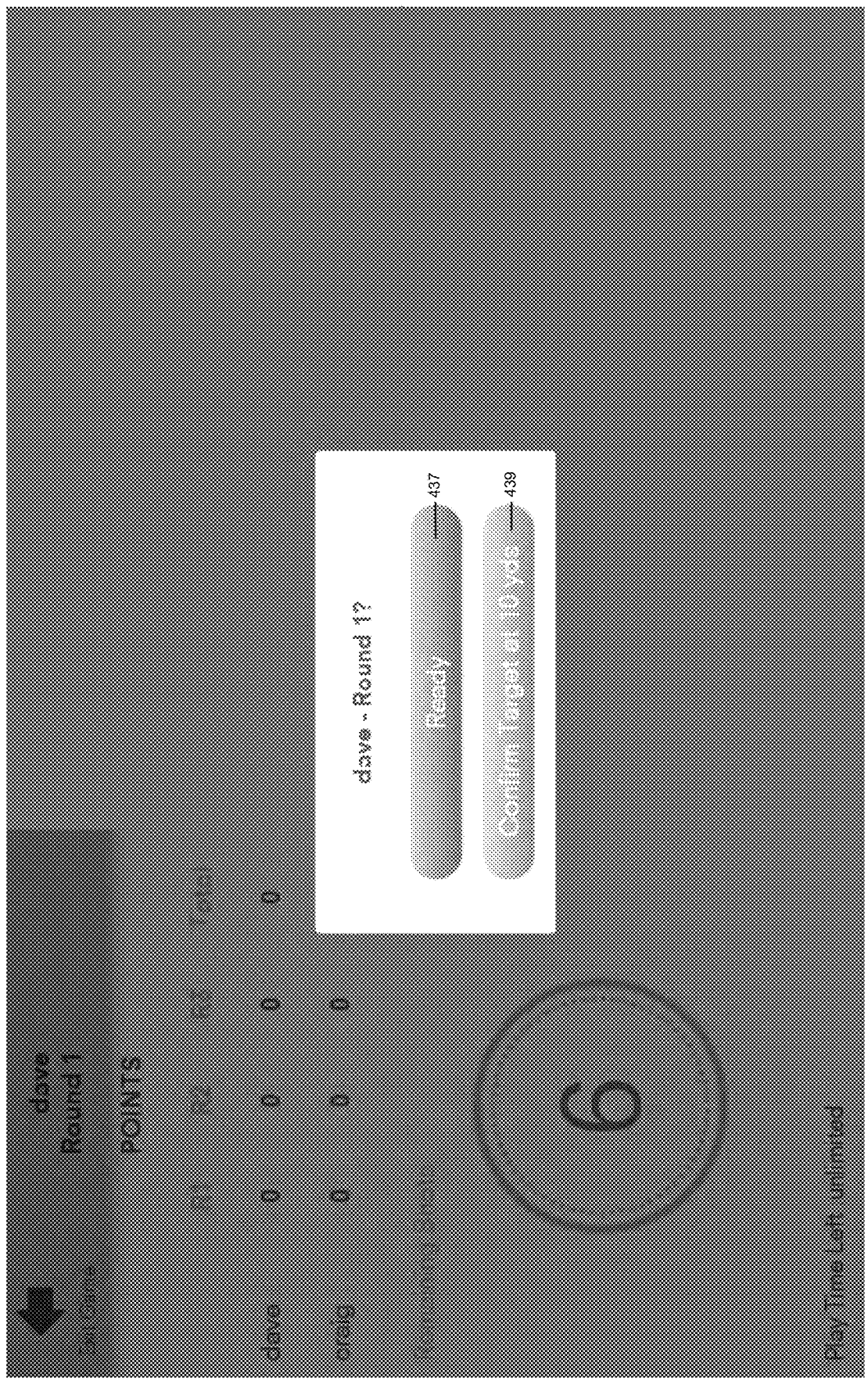
FIG. 11 illustrates a user-interface of a "Begin Play" "Ready" screen of the Live Fire Gaming system according to a preferred embodiment of the present disclosure.
Figure 12:
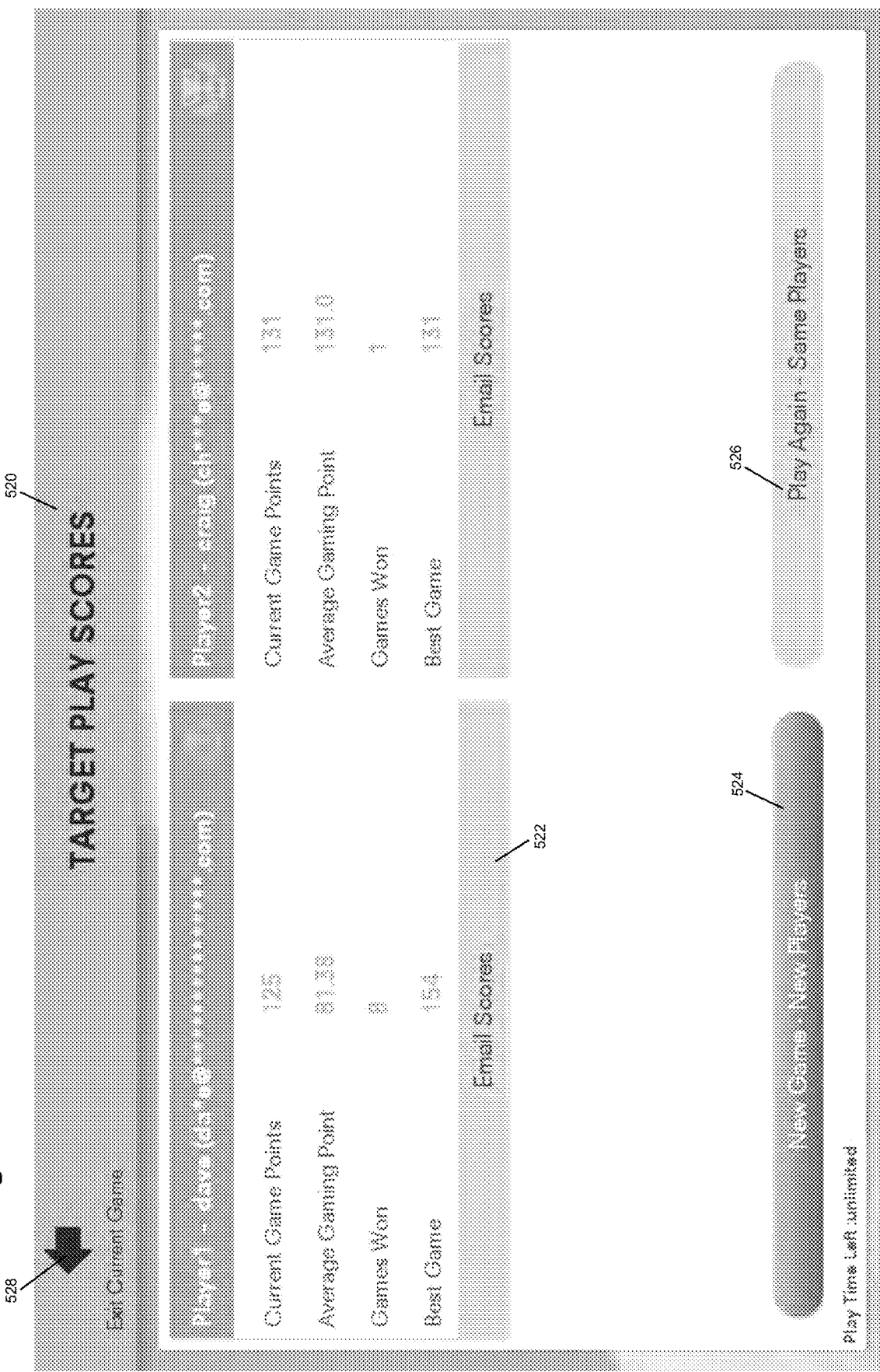
FIG. 12 illustrates a user-interface of a "Begin Play" "Target Play Scores" screen of the Live Fire Gaming system according to a preferred embodiment of the present disclosure.

With reference now to FIGS. 10 through 12, user-interface screens with play instructions for one exemplary game, "Target Play" 430, of the Live Fire Gaming system referenced in FIG. 9 is depicted. In FIG. 10, the user (after having selected "Target Play" 430 on the "Begin Play" user-interface screen 400 in FIG. 9) may add any number of desired players by selecting "Add Players" 432. From the list of added players, the user may then select the name(s) of the player(s) who will play the game by selecting "Choose Players" 434. Once all players for the current game ("Target Play") have been selected, the user may then select "Play" 436 to begin playing the game. The user-interface screen for playing directions for "Target Play" 430 may also allow a user to edit or delete information relating to the added players (e.g., player name, email address, etc.), and may include basic instructions and/or objectives of the game.

With reference to FIG. 11, once the user selects "Play" 436 in FIG. 10, each user may begin game play for each round by "Confirming Target at 10 yds" 439 for the target 110. This action may initiate camera 102 capabilities so that images may be captured to show impact points for each projectile fired by the shooting device upon the target 110 for each player in a game. Selection of "Ready" 437 may prompt camera 102 to begin relaying images of target 110 to the computer processing server 108. The user may then commence shooting at the target 110.

Figure 11A:
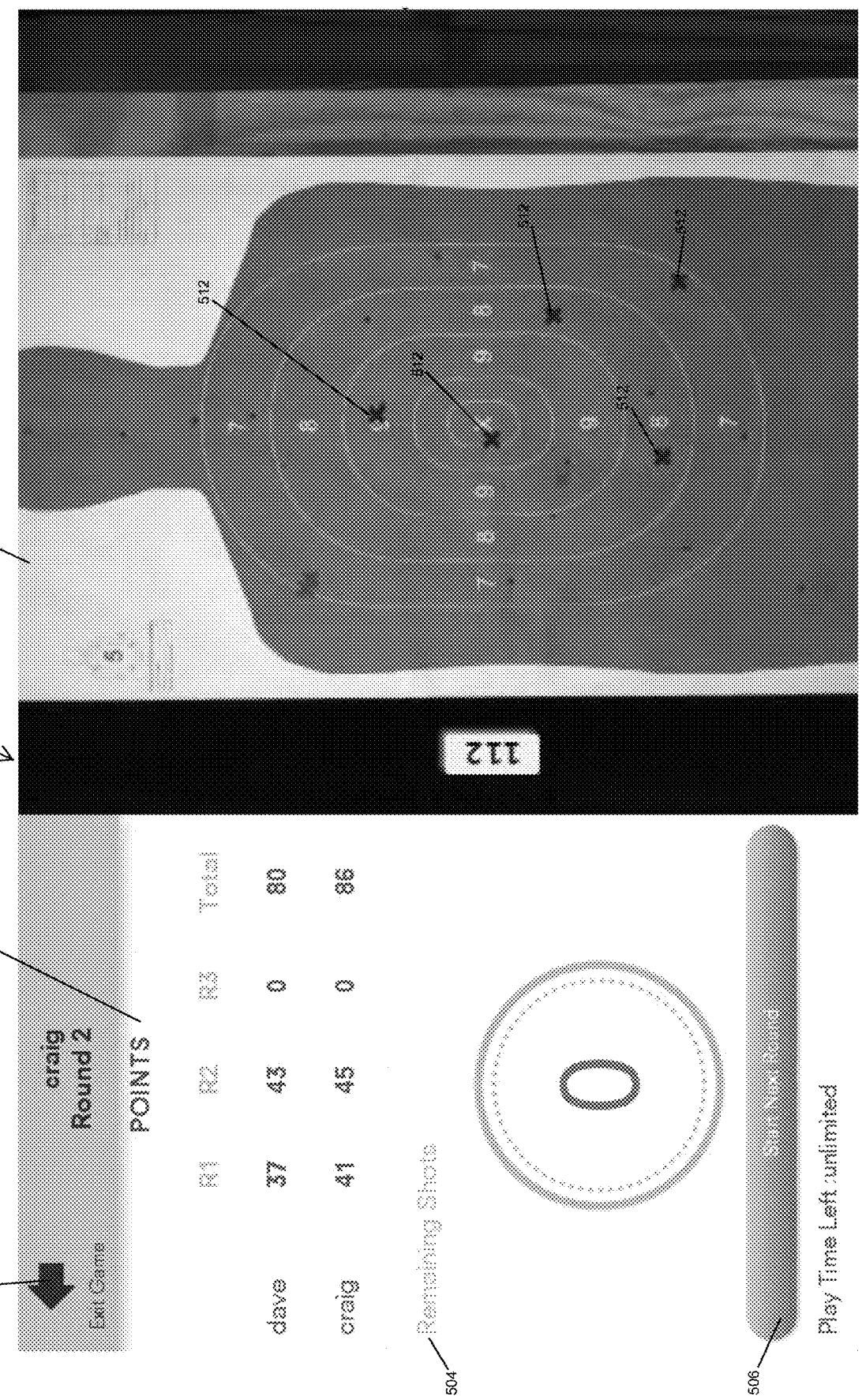
FIG. 11A illustrates a user-interface of a further "Begin Play" "Target Play" screen of the Live Fire Gaming system according to a preferred embodiment of the present disclosure.

FIG. 11A depicts touch screen device 104 showing a split screen user interface screen 500 once gaming for "Target Play" has commenced. Touch screen device 104 may show, e.g., performance metrics of the player(s), including point progress 502, remaining shots available for each player 504, as well as a live-camera visual 510 of the target 110. After a designated number of shots (e.g., 6 shots per round) by the user have been recognized by the IP software algorithm of computer processing server 108 (based on images captured, collected, and relayed by the camera 102 to computer processing server 108), the user's shot proficiency may be processed by the computer processing server 108 and then displayed on the touch screen device 104. Higher point values may be assigned to correspondingly higher-value areas of the target 110 as may be designated. Play for that round may then end for the first user and begin for a second user (if applicable). Second user may begin by selecting the "Confirming Target 10 yds" 439 and thereafter "Ready" 437 options (see FIG. 11), and the process of play may mirror the process previously described for the first user. A designated number of rounds (e.g., 3 rounds per game) may be played to complete a game cycle. The user with the most points after, for example, 3 rounds of play (6 shots per round), wins the game played. Additionally, for each round of play with more than one player, each player's impact points 512 on the target 110 may have distinguished colored markers identifying such (e.g., red "x" marker for the first player, and blue "x" markers for the second player, etc., where the most recent shot may be initially shown with a green "x" marker which then turns into the red or blue colored marker based on the player completing the shot). Alternatively, a user may choose to play alone, and scoring may be compared to a designated point value (e.g., 155 points, or the daily top 70 percentile game play points for that game), and the player's identified impact points on the target 110 may be the same marker color. As further shown in FIG. 11A, once a round of gaming has ended, users may also select "Start Next Round" 506 to start another round of play or "Exit Game" 508 to exit the game.

With reference now to FIG. 12, "Target Play Scores" user-interface screen 520 may be depicted on touch screen device 104 to show, for each individual game at this stage of game play, shot performance metrics and/or proficiency for player(s) of that completed game. Performance and/or proficiency metrics may include, but are not limited to, current game points, games won, points accumulated, best scores, etc. for the identified game. As shown in FIG. 12, the "Target Play Scores" user-interface screen 520, the user may email the performance metrics (including the current game scores, results, and/or proficiency data) to themselves by selecting "Email Scores" 522, and thereby upload the information onto various internet websites, such as social media sites, and/or onto an external application, etc. The user may then decide to play a new game with the same players by selecting "Play Again—Same Players" 526, play a new game with new players by selecting "New Game—New Players" 524, or exit the current game by selecting "Exit Current Game" 528. If the user opts to exit the current game, the user may return to the "Begin Play" user-interface screen 400 (FIG. 9) with the option to play a different game or permanently exit from the Live Fire Gaming system 100.

Figure 13:
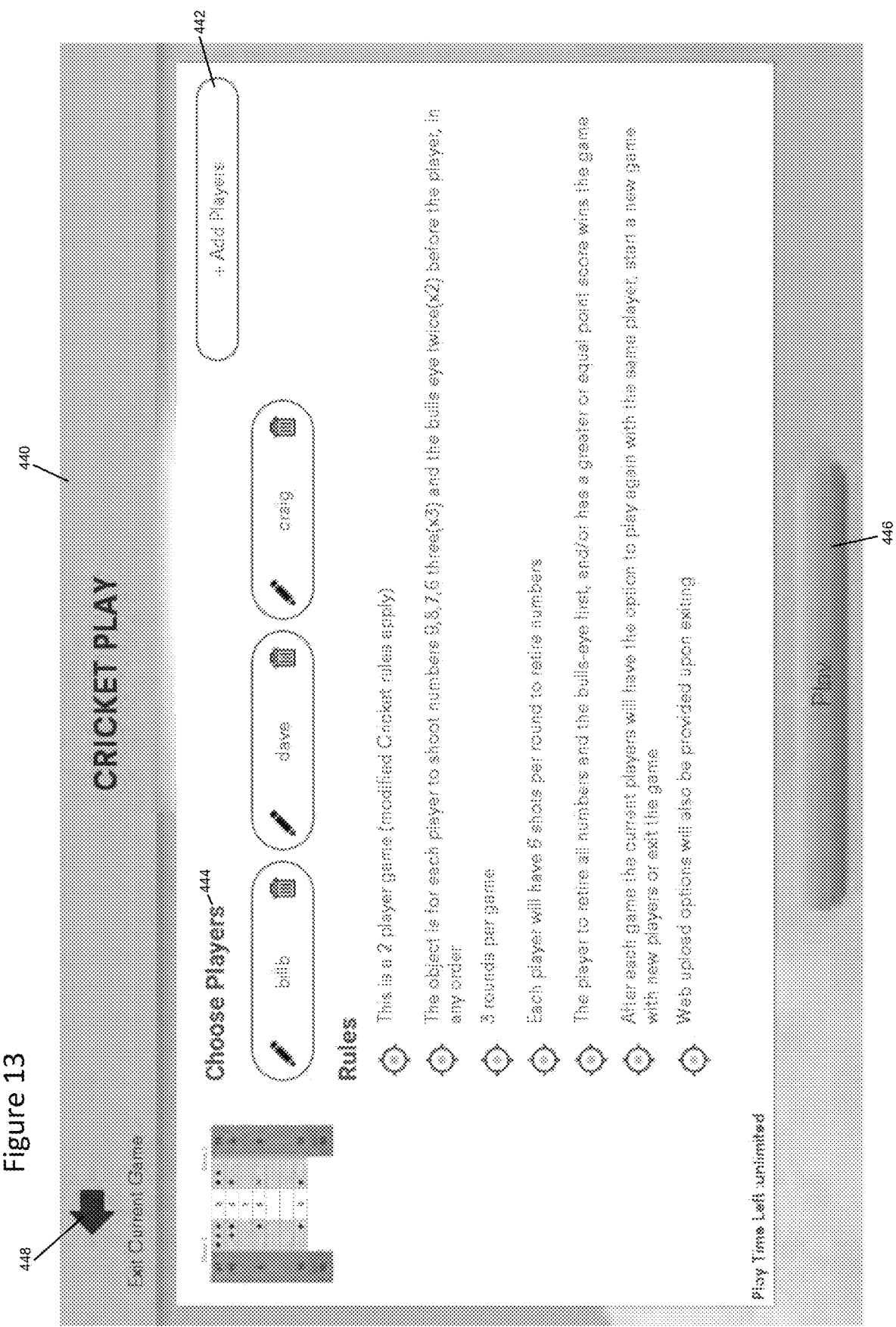
FIG. 13 illustrates a user-interface of a "Begin Play" "Cricket Play" screen of the Live Fire Gaming system according to a preferred embodiment of the present disclosure.

Reference is now made to FIGS. 13 and 13A, wherein is depicted another exemplary game, "Cricket Play" 440. As in "Target Play" 430 of FIG. 10, "Cricket Play" 440 may allow a user to add any number of desired players by selecting "Add Players" 442. From the list of added players, the user may then select the name(s) of the player(s) who will play the game by selecting "Choose Players" 444. Once all players for the current game ("Cricket Play") have been selected, the user may then select "Play" 446 to begin playing the game. The user-interface screen for "Cricket Play" 430 may also allow a user to edit or delete information relating to the added players (e.g., player name, email address, etc.), and may include basic instructions and/or objectives of the game. The game may initiate in the same manner, including by initiating capabilities of camera 102, as described above in conjunction with "Target Play" of FIGS. 10-11. For example, once the user selects "Play" 446 shown in FIG. 13, each user may begin game play for each round by "Confirming Target at 10 yds" for the target 110. This action may initiate camera 102 capabilities so that images may be captured to show impact points for each projectile fired by the shooting device upon the target for each player in a game. Selection of "Ready" may prompt camera 102 to begin relaying images of target 110 to the computer processing server 108. The user may then commence shooting at the target 110, and aiming to hit each of the displayed numerals and/or bulls-eye, as may be required by rules of the game.

With reference to FIG. 13A, once the user selects "Play" 446 (as shown in FIG. 13), touch screen device 104 may depict a split screen user-interface screen 600 showing performance metrics, e.g., proficiency data relating to the player(s), point progress 602, shots available for each player 604, as well as a live-camera visual of the target 110. After a designated number of shots (e.g., 6 shots per round) by the user have been recognized by the IP software algorithm of computer processing server 108 (based on images captured, collected, and relayed by the camera 102 to computer processing server 108), the round for the user may cease and the user's shot proficiency may be processed by the computer processing server 108 and then displayed on the touch screen device 104. Point progress may be shown after a predetermined number of shots are fired in a round and recognized by the computer processing server 108. Play may then end for the first user and commence for a second user. Second user may begin by selecting a "Confirming Target 10 yds" and/or "Ready" options (as discussed in conjunction with "Target Play" in FIG. 11), and the process of play may mirror the process previously described for the first user. The game generally is won by shooting each numerical and/or bulls-eye a pre-determined number of times (thereby retiring the target). A designated number of rounds may be played to complete a game cycle, or a game may be completed when a first user "retires the target", as required by rules of the game. The user to "retire the target" first, and/or accumulates the most points or equal points after three rounds of play may win the game. Additionally, for each round of play, and as "Cricket Play" requires two players, each player's impact points 612 on the target 110 may have distinguished colored markers identifying such (e.g. red "x" marker for the first player, and blue "x" markers for the second player, etc., where the most recent identified shot may be initially shown with a green "x" marker which then turns into a red or blue colored marker based on the player that completed the shot). As further shown in FIG. 13A, once a round of gaming has ended, users may select "Start Next Round" 606 to start another round of play, or "Exit Game" 608 to exit the game.

As described above in conjunction with FIG. 12 ("Target Play Scores"), after completing a "Cricket Play" game (and for each individual game at this stage of game play), performance metrics and/or proficiency data for player(s) of the completed game may be displayed on the touch screen device 104. Performance metrics may include, but are not limited to, current game points, games won, points accumulated, best scores, etc. for the game. The user may then decide to play a new game with the same players or with new players, or alternatively, to exit the current game. As further described in conjunction with FIG. 12 ("Target Play Scores"), a user completing or participating in "Cricket Play" may also email his/her performance metrics, including the current game score, results, and/or proficiency data to themselves and thereby upload the data onto various internet websites, such as social media sites, and/or onto an external application, etc. If the user opts to exit the current game, the user may return to the "Begin Play" user-interface screen 400 (FIG. 9) with the option to play a different game or permanently exit from the Live Fire Gaming system 100.

Figure 14:
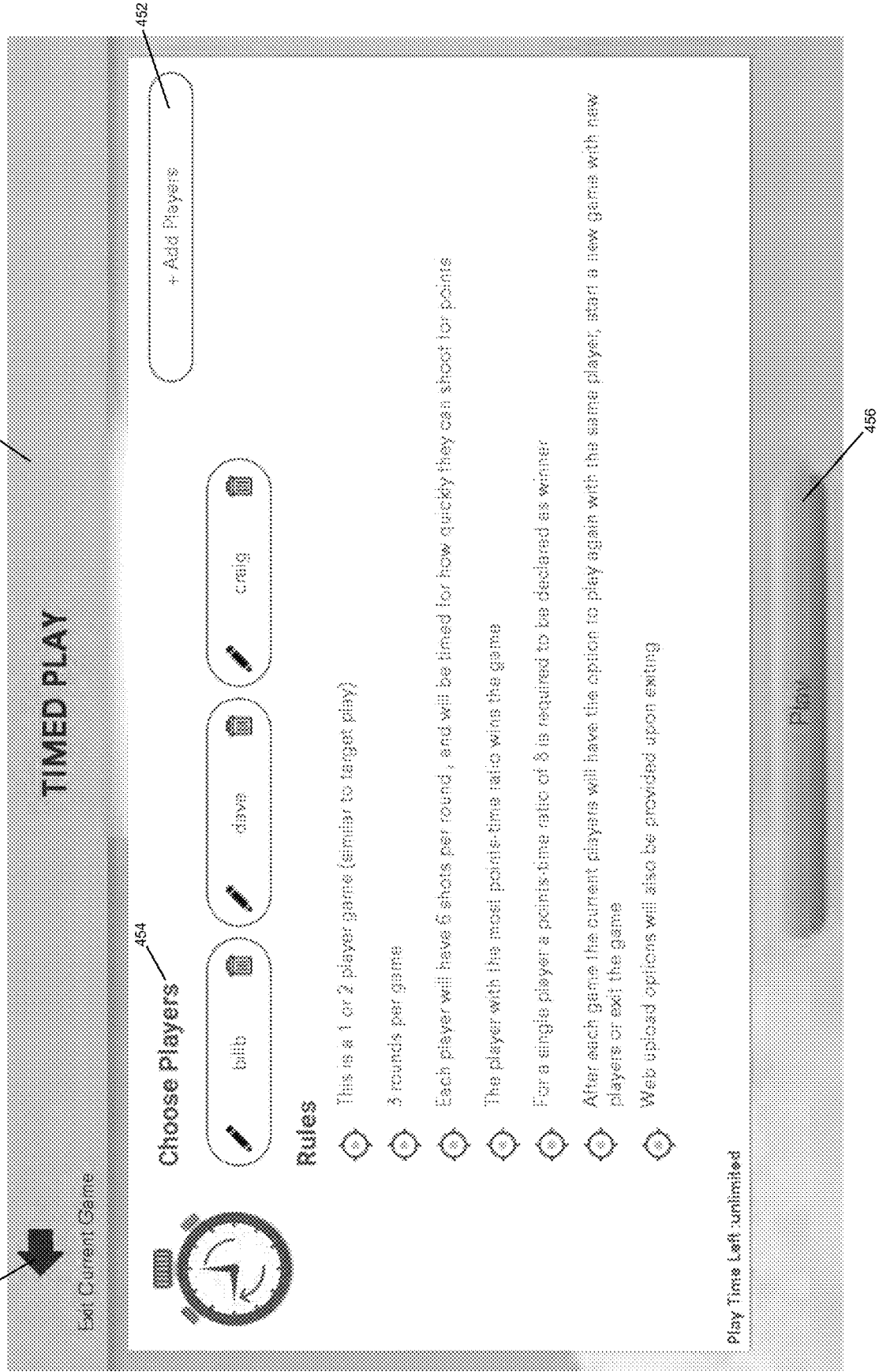
FIG. 14 illustrates a user-interface of a "Begin Play" "Timed Play" screen of the Live Fire Gaming system according to a preferred embodiment of the present disclosure.

Reference is now made to FIG. 14, wherein is depicted an exemplary game, "Timed Play" 450. As in "Target Play" 430 and "Cricket Play" 440, "Timed Play" 450 may allow a user may add any number of desired players by selecting "Add Players" 452. From the list of added players, the user may then select the name(s) of the player(s) who will play the game by selecting "Choose Players" 454. Once all players for the current game ("Timed Play") have been selected, the user may then select "Play" 456 to begin playing the game. The user-interface screen for "Timed Play" 430 may also allow a user to edit or delete information relating to the added players (e.g., player name, email address, etc.), and may include basic instructions and/or objectives of the game. The game may initiate in the same manner, including by initiating capabilities of camera 102, as described above in conjunction with "Target Play" of FIGS. 10-11. For example, once the user selects "Play" 456 shown in FIG. 14, each user may begin game play for each round by "Confirming Target at 10 yds" for the target 110. This action may initiate camera 102 capabilities so that images may be captured to show impact points for each projectile fired by the shooting device upon the target for each player in a game. Selection of "Ready" may prompt camera 102 to begin relaying images of target 110 to the computer processing server 108. The user may then commence shooting at the target 110, as may be required by rules of the game.

Figure 14A:
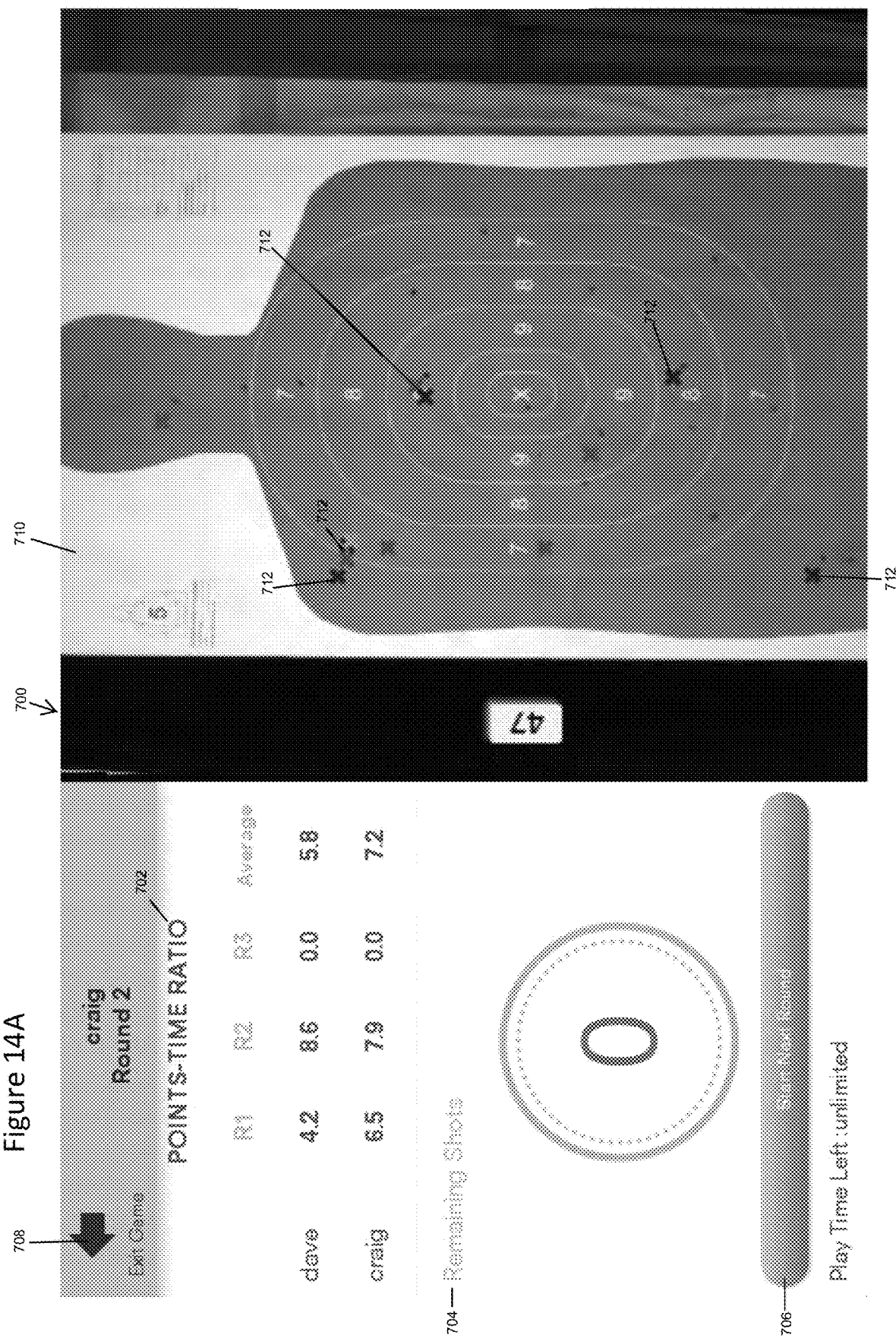
FIG. 14A illustrates a user-interface of a further "Begin Play" "Timed Play" screen of the Live Fire Gaming system according to a preferred embodiment of the present disclosure.

With reference to FIG. 14A, once the user selects "Play" 456 (as shown in FIG. 14), touch screen device 104 may depict a split screen user-interface screen 700 showing performance metrics, e.g., proficiency data relating to the players(s), points/time ratios 702 for each player, shots available for each player 704, as well as a live-camera visual 710 of the target 110. After a designated number of shots (e.g., 6 shots per round) by the user have been recognized by the IP software algorithm of the computer processing servers 108, the time clock may stop, the user's turn may cease, and the user's shot proficiency may be processed by the computer processing server 108, and then displayed on the touch screen device 104. Higher point values may be assigned to correspondingly higher-value areas of the target 110 as may be designated. Play may then end for the first user and begin for a second user (if applicable). Second user may begin by selecting the "Ready" option, and the process of play may mirror the process previously for the first user. A designated number of rounds may be played to complete a game cycle. In "Timed Play," the user with the highest point/time ratio value after 3 rounds of play, establishing a combined proficiency in accuracy and speed, wins the game played. Additionally, for each round of play with more than one player, each player's impact points 712 on the target 110 may have distinguished colored markers identifying such (e.g., red "x" marker for the first player, and blue "x" markers for the second player, etc., where the most recently-fired shot may be initially shown with a green "x" marker which then turns into a red or blue colored marker corresponding to the player that completed the shot). Alternatively, if a user chooses to play alone, scoring may be compared to a designated point value (e.g., 8 Points-Time Ratio, or the daily top 70 percentile Points-Time Ratio for that game), and the player's identified impact points on the target 110 may be a single marker color.

As described above in conjunction with FIG. 12 ("Target Play Scores"), after completing a "Timed Play" game, shot performance metrics and/or proficiency data may include for players may be displayed on the touch screen device 104. Performance metrics and/or proficiency data may include, but are not limited to, current game points, games won, points accumulated, points/time ratios, best scores, etc. for the game. The user may then decide to play a new game with the same players or with new players, or alternatively, to exit the current game. As further described in conjunction with FIG. 12 ("Target Play Scores"), the user playing "Timed Play" may email the performance metrics (including the current game scores, results, and/or proficiency data) to themselves and thereby upload onto various internet websites, such as social media sites, and/or onto an external application, etc. If the user opts to exit the current game, the user may return to the "Begin Play" user-interface screen 400 (FIG. 9) with the option to play a different game or permanently exit from the Live Fire Gaming system 100.

Figure 15:
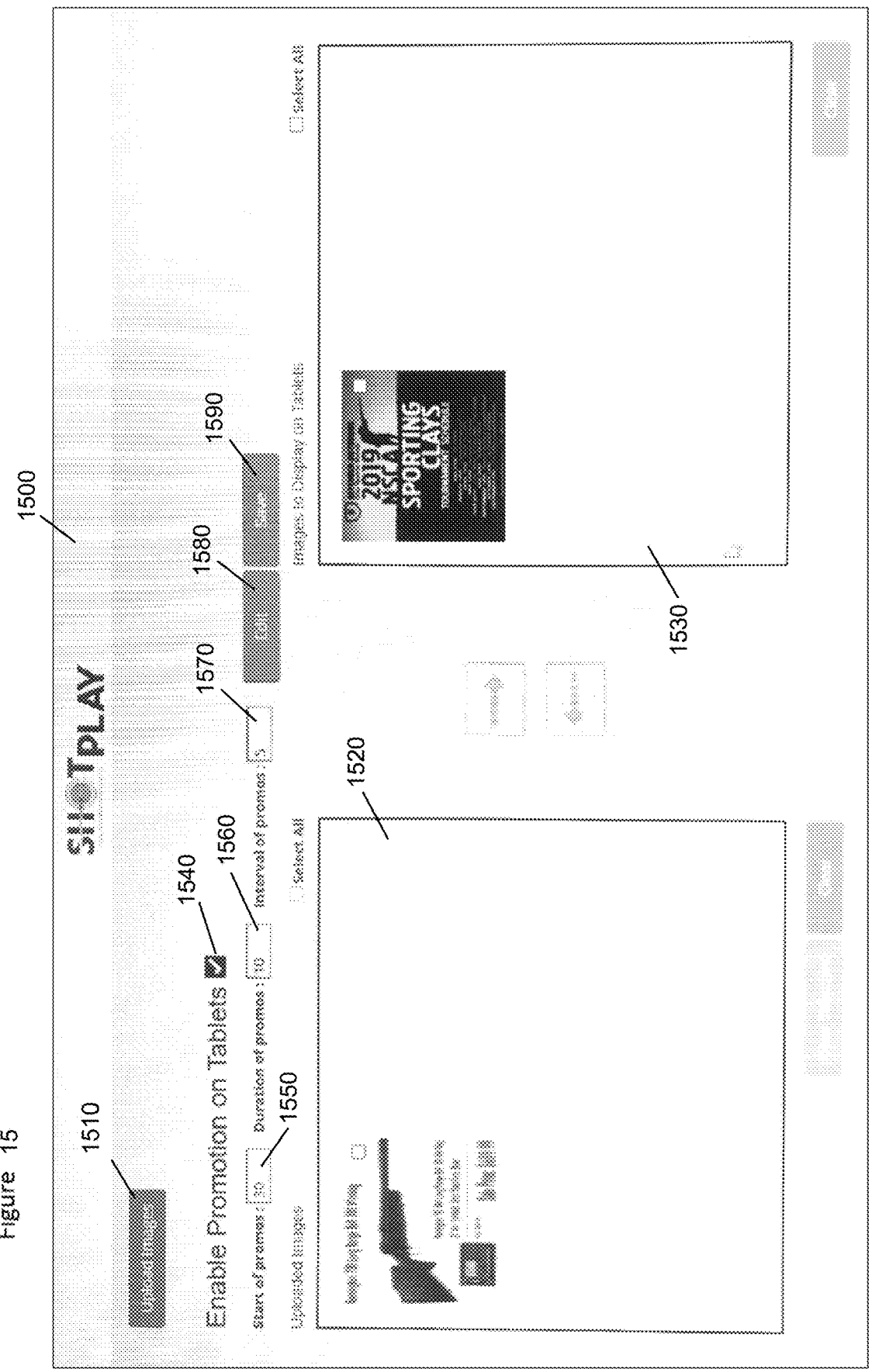
FIG. 15 illustrates a marketing platform screen that enables promotions on the user-interface of the Live Fire Gaming system according to a preferred embodiment of the present disclosure.

Reference is now made to FIG. 15, wherein is depicted an exemplary user-interface, marketing platform 1500 of the Live Fire Gaming system 100 according to a preferred embodiment of the present disclosure. The marketing platform 1500 is designed to enable or disable selected marketing material to be presented to the user through the touch screen device 104 as promotion pop-ups through the course of gameplay.

As shown in FIG. 15, the marketing platform 1500 includes the ability to "Upload Images" 1510 of preferred marketing material to the server 108, wherein the uploaded images are displayed in the "Uploaded Images" box 1520. From the uploaded images, promotion pop-ups may be selected to be presented to the user, wherein the selected images are shown in the "Images to Display on Tablets" box 1530. The marketing platform 1500 allows for enabling and disabling promotion pop-ups on select touch screen devices 104, via the "Enable Promotion on Tablets" feature 1540, where more than one shooting lane is outfitted with the Live Fire Gaming system 100 and an accompanying touch screen device 104. Adjustments may be made to several aspects of the promotion pop-ups, including but not limited to the timing of when promotion pop-ups will be displayed on the touch screen device 104 via the "Start of promos" box 1550, the duration of the promotion pop-ups via the "Duration of promos" box 1560, and the time between individual promotion pop-ups on the touch screen device 104 via the "Interval of promos" box 1570. These adjustments may be edited via the "Edit" button 1580 and saved via the "Save" button 1590. The marketing platform 1500 is also equipped to enable a shooter using the Live Fire Gaming system 100 to upload (via email, or similar data transfer methods) desired promotion material through the touch screen device 104 for viewing at a later date.

It is to be understood that the implementations are not limited to particular systems or methods described, which may, of course, vary. For example, the Live Fire Gaming system 100 need not be limited to the specific methods, system components, and/or user interface displays disclosed herein. Likewise, the Live Fire Gaming system 100 is not limited to the specific games and/or the methods of playing disclosed herein. There may be other variations, iterations, and designs for the Live Fire Gaming system 100 and/or games that allow for calculation of similar performance metrics and/or scores in single and/or multi-player gaming mode (in person or online). Additionally, the Live Fire Gaming system 100 and methods described herein may be adapted for use with various technologies, environments, and applications, including web and/or mobile applications, virtual applications, etc. Moreover, the invention defined by the above paragraphs is not to be limited to particular details set forth in the above description, as many apparent variations thereof are possible without departing from the spirit or scope of the present disclosure. It is also to be understood that the terminology used herein is for the purposes of describing particular implementations only and is not intended to be limiting.

The invention claimed is:

1. A system for live fire gaming comprising:
 a camera, coupled to a server, for capturing images of a target impacted by projectiles being shot onto the target by a shooting device;
 a processing algorithm, implemented through the server, for identifying each single incremental change to the target associated with individual impact points of projectiles shot onto the target, each identification using an aligned image of the target that is based on only one captured image from the camera for each impact point; and
 a user-interface touch screen display, coupled to the server, for displaying each of the impact points on a representation of the target;
 wherein the aligned image is created by uploading to the server the one captured image from the camera as an initial image of the target, the processing algorithm enhancing the initial image for clarity to form an enhanced image, and the processing algorithm orientationally aligning the enhanced image to a template target stored in a memory of the server to form the aligned image.

2. The system of claim 1, wherein the processing algorithm further calculates a performance metric based upon the data for all identified single incremental changes to the target associated with the impact points of projectiles shot onto the target; and
 wherein the touch screen display, coupled to the server, displays and enables user interfacing with the performance metric.

3. The system of claim 2, wherein the performance metric comprises: measurements relating to accuracy of the impact points.

4. The system of claim 3, wherein the performance metric further comprises: point values based on the accuracy of the impact points.

5. The system of claim 1, further comprising:
 a marketing platform for uploading marketing material to the server for displaying on the touch screen display to a user interfacing with the system.

6. The system of claim 5, wherein the marketing platform enables selection of particular marketing material to be displayed from the uploaded marketing material.

7. The system of claim 5, wherein the marketing platform enables adjustments to at least one of:
 a start time for marketing material to be displayed on the touch screen device, a duration for marketing material to be displayed on the touch screen device, and an interval of time between displays of individual marketing materials.

8. The system of claim 5, wherein the marketing platform enables a user of the system to select via the touch screen device marketing material for electronic transmission to be viewed at a later time.

9. The system of claim 1, further comprising:
 a safety module for presenting firearm safety information and protocol on the touch screen display to a user interfacing with the system.

10. The system of claim 1, further comprising:
a training module for presenting firearm training information and instruction on the touch screen display to a user interfacing with the system.

11. The system of claim 1, wherein the processing algorithm identifies each incremental change to the target associated with an impact point of a projectile shot onto the target without relying on physical measurements from the target.

12. The system of claim 1, wherein the processing algorithm identifies each incremental change to the target associated with an impact point of a projectile shot onto the target without relying on markings or other alterations to the template target.

13. A system for live fire gaming comprising:
a camera, coupled to a server, for capturing images of a target being impacted by projectiles being shot onto the target by a shooting device;
a processing algorithm, implemented through the server, for identifying each single incremental change to the target associated with individual impact points of projectiles shot onto the target, each identification using an aligned image of the target that is based on only one captured image from the camera for each impact point; and
a user-interface touch screen display, coupled to the server, for displaying and interfacing with one or more of the following:
a representation of the target showing the impact points;
marketing material;
firearm safety information; and
firearm training instructions;
wherein the aligned image is created by uploading to the server the one captured image from the camera as an initial image of the target, the processing algorithm enhancing the initial image for clarity to form an enhanced image, and the processing algorithm orientationally aligning the enhanced image to a template target stored in a memory of the server to form the aligned image.

14. A method for live fire gaming comprising the steps of:
providing a camera coupled to a server;
providing a processing algorithm implemented through the server;
capturing with the camera a single image relating to an impact point of each projectile fired onto a physical target by a shooting device;
adjusting with the processing algorithm the single captured image to produce an enhanced image;
identifying with the processing algorithm an incremental change to the physical target associated with the impact point of each projectile using only the enhanced image and a template image of the physical target; and
displaying each impact point on an electronic representation of the physical target;
wherein the identifying step comprises the processing algorithm orientationally aligning the enhanced image to the template image of the physical target to produce an aligned image.

15. The method of claim 14, further comprising:
the processing algorithm using the template image as a basis to adjust the single captured image.

16. The method of claim 15, further comprising:
the processing algorithm analyzing the single captured image for focus; and
the processing algorithm enhancing the clarity of the single captured image to produce the enhanced image.

17. The method of claim 16, further comprising:
the processing algorithm analyzing the enhanced image in comparison to the template image to confirm the type of target represented in the enhanced image matches the type of target represented in the template image.

18. The method of claim 14, further comprising:
the processing algorithm emphasizing the aligned image to sharpen and then filter target details to determine the incremental change associated with the aligned image relative to programmed filters to identify the impact point of the projectile and produce an emphasized image with the impact point identified.

19. The method of claim 18, further comprising:
the processing algorithm extracting the target details filtered from the emphasized image associated with the impact point of the projectile;
the processing algorithm obtaining X, Y coordinates of the impact point; and
displaying the impact point on the electronic representation of the physical target.

* * * * *